US00RE37245E

(19) United States
(12) Reissued Patent
Scholten et al.

(10) Patent Number: US RE37,245 E
(45) Date of Reissued Patent: Jun. 26, 2001

(54) VARIABLE AIR VOLUME ENVIRONMENTAL MANAGEMENT SYSTEM INCLUDING A FUZZY LOGIC CONTROL SYSTEM

(75) Inventors: Jean Henry Albert Scholten; Anno Johannes Scholten, both of Grapevine, TX (US)

(73) Assignee: EMS Control Systems International, Osborne Park (AU)

(21) Appl. No.: 08/932,652

(22) Filed: Sep. 18, 1997

Related U.S. Patent Documents

Reissue of:
(64) Patent No.: 5,450,999
Issued: Sep. 19, 1995
Appl. No.: 08/278,616
Filed: Jul. 21, 1994

(51) Int. Cl.[7] ..... F24F 7/00; F24F 11/00
(52) U.S. Cl. ..... 236/49.3; 236/78 D; 454/258; 165/217
(58) Field of Search ..... 236/49.3, 78 D; 454/258; 62/186; 165/217

(56) References Cited

U.S. PATENT DOCUMENTS 4,818,970 * 4/1989 Natale et al. ..... 169/61 X
4,928,750 * 5/1990 Nurczyk ..... 165/217
4,969,508 * 11/1990 Tate et al. ..... 236/51 X
5,043,862 * 8/1991 Takahashi et al. ..... 364/148.05 X
5,148,977 * 9/1992 Hibino et al. ..... 236/49.3
5,156,013 * 10/1992 Arima et al. ..... 236/78 D
5,251,124 * 10/1993 Matsunaga ..... 364/148.05
5,344,069 * 9/1994 Narikiyo ..... 236/49.3
5,344,070 * 9/1994 Akasaka et al. ..... 236/49.3

FOREIGN PATENT DOCUMENTS

0248380 * 12/1987 (EP) ..... 236/49.3

* cited by examiner

*Primary Examiner*—William Wayner
(74) *Attorney, Agent, or Firm*—Gray Cary Ware & Freidenrich, LLP

(57) ABSTRACT

A controller for a variable air volume terminal of a variable air volume air conditioning system which comprises a temperature sensing circuitry for generating a temperature process value, a setpoint determining circuitry for establishing a temperature setpoint, an airflow signal circuitry for generating an airflow setpoint in response to the temperature process value and the temperature setpoint. A flow sensing circuitry for generating a flow process value in response to a predetermined set of flow sensing inputs and damper control circuitry for generating a damper motor operation signal to control the damper motor in response to the flow process value and the airflow setpoint. The damper control circuitry comprises a fuzzy logic control mechanism for implementing a set of fuzzy logic rule-based instructions in generating the damper motor operating signal.

27 Claims, 10 Drawing Sheets

← FLOW ERROR X

| FLOW ERROR Y | | -100 NB | -40 NH | -10 NS | 0 ZE | +10 PS | +40 PM | +100 PB |
|---|---|---|---|---|---|---|---|---|
| -100 | NB | PB | PB | PB | PB | PB | PM | PS |
| -40 | NH | PM | PM | PM | PM | PM | PS | PS |
| -10 | NS | PS | PS | PS | PS | PS | PS | PS |
| 0 | ZE | PS | PS | ZE | ZE | ZE | NS | NS |
| +10 | PS | NS | NS | NS | NS | NS | NS | NS |
| +40 | PM | NS | NS | NM | NM | NM | NM | NM |
| +100 | PB | NS | NM | NB | NB | NB | NB | NB |

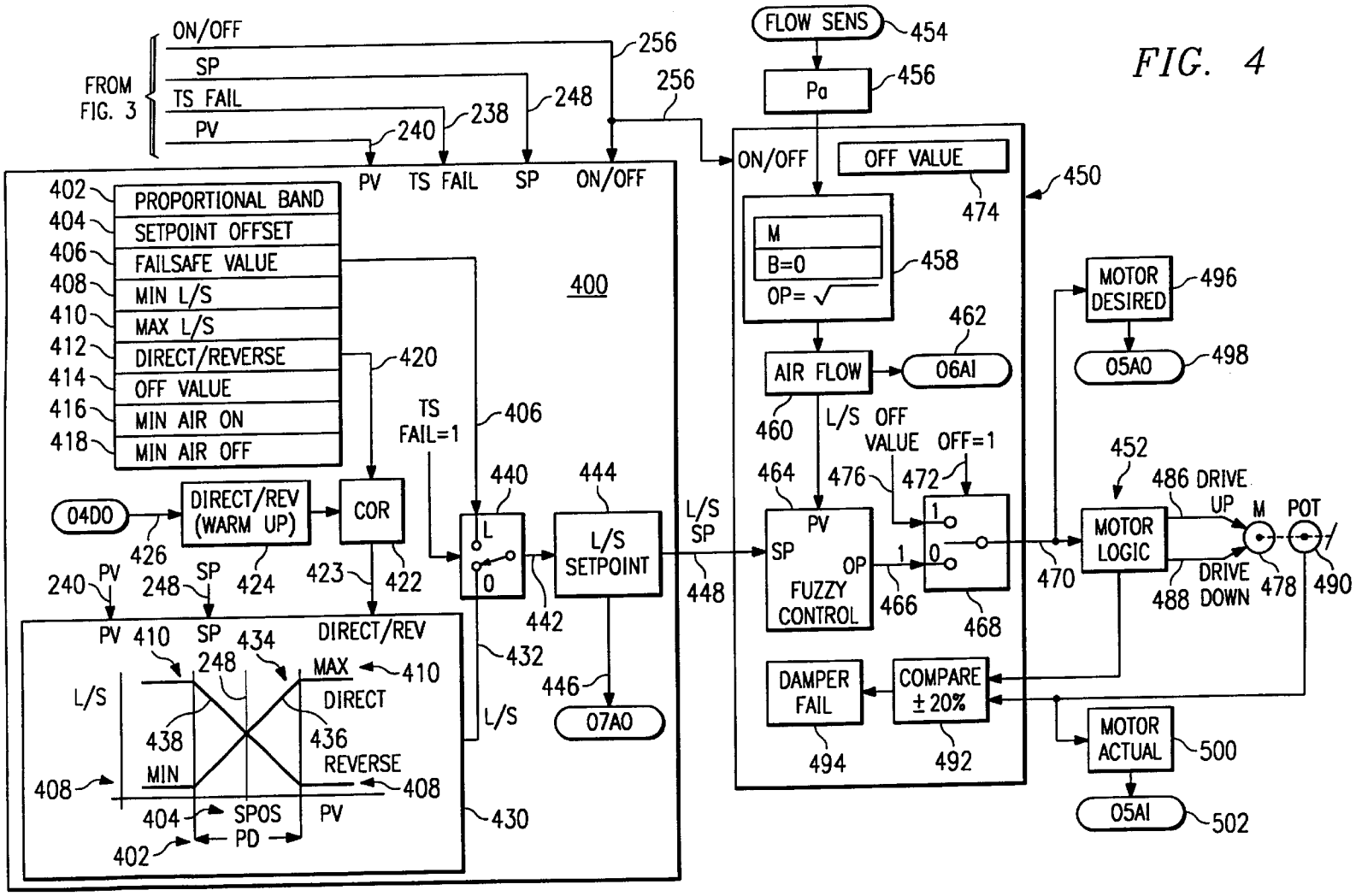
FIG. 4
FLOW SENS
Pa
ON/OFF
OFF VALUE
M
B=0
OP=
AIR FLOW
L/S
OFF VALUE
OFF=1
PV
SP
OP
FUZZY CONTROL
COMPARE ± 20%
DAMPER FAIL
MOTOR DESIRED
O5AO
O6AI
MOTOR LOGIC
DRIVE UP
DRIVE DOWN
M
POT
MOTOR ACTUAL
O5AI
L/S SP
L/S SETPOINT
O7AO
ON/OFF
SP
TS FAIL
PV
PROPORTIONAL BAND
SETPOINT OFFSET
FAILSAFE VALUE
MIN L/S
MAX L/S
DIRECT/REVERSE
OFF VALUE
MIN AIR ON
MIN AIR OFF
TS FAIL=1
COR
DIRECT/REV (WARM UP)
O4DO
DIRECT/REV
MAX
DIRECT
REVERSE
MIN
SPOS
PD
FROM FIG. 3

| | X | Y | Z |
|---|---|---|---|
| PB | -100 | -100 | 50 |
| | -40 | -100 | |
| | -10 | 100 | |
| | 0 | -100 | |
| | 10 | -100 | |
| PM | -100 | -40 | 25 |
| | -40 | -40 | |
| | -10 | -40 | |
| | 0 | -40 | |
| | 10 | -40 | |
| | 40 | -100 | |
| PS | -100 | -10 | 10 |
| | -40 | -10 | |
| | -10 | -10 | |
| | 0 | -10 | |
| | 10 | -10 | |
| | 40 | -10 | |
| | 100 | -10 | |
| | -100 | 0 | |
| | -40 | 0 | |
| | 40 | -40 | |
| | 100 | -40 | |
| | 100 | -100 | |
| ZE | -10 | 0 | 7 |
| | 0 | 0 | 7 |
| | 10 | 0 | 7 |

| | X | Y | Z |
|---|---|---|---|
| NB | 100 | 100 | 50 |
| | 40 | 100 | |
| | 10 | 100 | |
| | 0 | 100 | |
| | -10 | 100 | |
| NM | -40 | 100 | 25 |
| | -10 | 40 | |
| | 0 | 40 | |
| | 10 | 40 | |
| | 40 | 40 | |
| | 100 | 40 | |
| NS | 40 | 0 | 10 |
| | 100 | 0 | |
| | -100 | 10 | |
| | -40 | 10 | |
| | -10 | 10 | |
| | 0 | 10 | |
| | 10 | 10 | |
| | 40 | 10 | |
| | 100 | 10 | |
| | -100 | 40 | |
| | -40 | 40 | |
| | -100 | 100 | |

*FIG. 5*

VARIABLE AIR VOLUME ENVIRONMENTAL MANAGEMENT SYSTEM INCLUDING A FUZZY LOGIC CONTROL SYSTEM

Matter enclosed in heavy brackets [ ] appears in the original patent but forms no part of this reissue specification; matter printed in italics indicates the additions made by reissue.

*This application is a reissue of U.S. Pat. No. 5,450,999. A continuation of this case has been filed as U.S. Ser. No. 09/379,239, Aug. 23, 1999.*

TECHNICAL FIELD OF THE INVENTION

The present invention relates to control systems for environments such as office buildings and commercial establishments, and more particular, to a variable air volume (VAV) environmental management system that integrates a fuzzy logic control system in a stand-alone package for providing all necessary functions of a VAV terminal that may be easily networked into a complex environmental management system and that uses fuzzy logic to provide precise temperature control with the minimal amount of system setup.

BACKGROUND OF THE INVENTION

A variable air volume (VAV) environmental management or air conditioning system modulates the amount of air that flows to different offices or locations within an environment such as an office building or other dwelling structure where numerous people live or work. By maintaining constant the temperature that flows through dampers of the air conditioning system and, instead adjusting the position of the damper or the volume of air that flows through the damper to the various locations within the environment, is possible to more efficiently and effectively address the comfort needs of different locations within the environment.

Known VAV controllers are large remote electronic boxes or cabinets that electrically connect to actuator motors that control the position of the dampers of the environmental control system. These controllers are often, for example, pneumatic controllers or electrical controllers that respond to temperature input to adjust the position of the damper in response to the sensed temperature of the various locations. These pneumatic drives or electrical systems are generally not inter-related from one location to another within the environment. As a result, compensating for temperature differences in one location frequently generates air flow problems in other locations within the environment. The air conditioning system, in these instances, operates in less than an ideal mode.

In recent years, microprocessors have been used to improve the efficiency of controlling various locations within the office or environment. These microprocessors attempt to relate locations within the environment to one another by using an air velocity pickup probe input. The air velocity pickup probe provides an input to the microprocessor that permits the microprocessor to compensate for drops in air flow to one location that arise from an increase in air flow to another location. In other words, microprocessor-based VAV terminal controllers attempt to improve the overall operation of the environmental management system by compensating for drops in air flow that occur as temperature needs or setpoints change at different locations within the environment. There are, however, significant limitations that associate with existing microprocessor-based VAV terminal controllers.

Significant limitations of existing microprocessor-based VAV terminal controllers are, for example, that the systems are bulky and include large printed circuit boards that mount within separate controller chassis. These known systems include motors and wires to control the damper motor in the environmental control system. In addition, existing microprocessor-based controllers at best use local area network technology for system data communication. Local area networks, however, are not designed for communicating control system data within a control system architecture. These local area networks inefficiently communicate temperature, pressure and other variable values from one location to another and to a central file server.

Another limitation associated with existing microprocessor-based VAV terminal controllers is the use of complicated instruction sets for generating the desired damper actuator control signal. For example, even the most efficient VAV terminal controllers use a control algorithm known as a proportional integral differential (PID) algorithm to drive the damper motor. The PID algorithm itself is complex and requires significant computational resources to generate the desired damper motor operating signal. The complexity of the PID algorithm requires significant setup time for each of the locations within the office or commercial environment. The setup time and inherent complexity of the algorithm makes such systems prone to error and highly susceptible to less than optimal performance.

Consequently, there is a need for an improved microprocessor-based VAV terminal controller that avoids the space requirements and separate bulky controller circuit chassis of existing microprocessor-based VAV terminal controllers.

There is a need for an improved microprocessor-based VAV terminal controller that is more effectively operable with other aspects of the environmental management system as well as with the VAV air conditioning system within the environmental management system.

There is yet the need for an improved VAV terminal controller that is simple to setup and use and that avoids the complexity of existing microprocessor-based controllers that use PID control instructions or other similarly complicated instructions to adjust for the differences in air flow within the air conditioning portion of the environmental control system.

SUMMARY OF THE INVENTION

The present invention, accordingly, provides an improved VAV terminal controller that overcomes limitations and disadvantages of existing VAV terminal controllers and that controls dampers at locations within a VAV air conditioning system and that integrates a fuzzy logic control system to more efficiently communicate with the associated environmental control system and that in a stand-alone package, attaches to the damper actuator motor.

The improved VAV terminal controller, according to one aspect of the invention, includes temperature sensing circuitry for generating a temperature process value. Temperature setpoint determining circuitry establishes a temperature setpoint. Air flow signal circuitry generates an air flow setpoint in response to the temperature process value and the temperature setpoint. Airflow sensing circuitry generates the airflow process value in response to a predetermined set of airflow sensing inputs. Damper control circuitry generates a damper motor operation signal to control the damper actuator motor in response to the airflow process value and the airflow setpoint. The damper control circuitry includes a fuzzy logic control mechanism for implementing a set of fuzzy logic or rule-based instructions in generating the damper actuator motor operating signal.

A technical advantage of the present invention is that it provides in a single module a control device for operating the damper actuator motor of a VAV air conditioning system. The present invention is so compact that it may be positioned on the damper actuator motor itself, instead of at a remote site in a separate control circuitry chassis. The present invention incorporates advanced packaging technology to eliminate the need for a large printed circuit board chassis that conventional VAV terminal controllers require. A VAV air conditioning system that employs the present invention, therefore, is easier to install, operate, and maintain than systems that use conventional microprocessor-based VAV terminal controllers.

Another technical advantage of the present invention is that it provides a local, stand-alone control mode or a network control mode using a high-speed, open protocol within a local operating network (LON®). The protocol that the present invention uses more effectively communicates temperature values, pressure values, and other values and parameters than do systems that employ protocols of local area networks (LANs). The present invention includes operating firmware in a single integrated circuit device that requires no interfaces or protocol converters and that may be completely inter-operable with other (LON®) systems.

A further technical advantage of the present invention is that it implements a fuzzy logic or rule-based control instruction set to more efficiently generate the desired damper motor operating signals. Using fuzzy logic control instructions, the present invention ensures precise and efficient operation that requires only a minimal effort to program and commission each VAV terminal within the VAV air conditioning system.

Additional technical advantages that the present invention possesses over existing microprocessor-based VAV terminal controllers include pressure dependent or pressure independent control modes; built-in fire and warm-up operating modes; and an optional integral remote environmental monitoring (REM) sensor. In the preferred embodiment, all setpoints may be adjustable using an optional hand-held console. The preferred embodiment is simple to install and to commission. The damper control features that the present embodiment provides include (1) automatic calibration of the damper stroke, (2) manual drive of the damper to any position within the damper strokes; and (3) automatic stop of damper control at the damper actuator motor end limits. The preferred embodiment includes an inexpensive airflow pickup sensor that may connect directly to the terminal controller and that consumes minimal amounts of power. The system of the preferred embodiment includes a totally integrated controller, flow transducer, and damper actuator as part of the VAV terminal controller. Other features of the present invention and preferred embodiment will become apparent upon reading the following detailed description of the illustrative embodiment in conjunction with an understanding of the associated drawings.

BRIEF DESCRIPTION OF THE DRAWINGS

The invention and its modes of use and advantages are best understood by reference to the following description of illustrative embodiments, when read in conjunction with the accompanying drawings, wherein:

FIG. 1 shows one embodiment of the VAV terminal controller of the present invention;

FIGS. 3 and 4 provide illustrative flow diagrams of the functions of the present embodiment;

FIGS. 5 and 6 illustrate one embodiment of the fuzzy logic weight matrix and parameter ranges, respectively, for implementing the control instructions of the present invention.

DETAILED DESCRIPTION OF ILLUSTRATIVE EMBODIMENTS

The illustrative embodiments of the present invention are best understood by referring to the FIGUREs wherein like numerals are used for like and corresponding parts of the various components.

With a room temperature sensor and setpoint adjust, the VAV terminal controller of the present embodiment provides a complete stand-alone controller for any type of VAV terminal. When networked on an open protocol local operating network (LON), the VAV terminal controller of the present embodiment provides system-wide control, monitoring, and optimization. The present embodiment may include an integral flow transducer, damper actuator, feedback potentiometer for either pressure independent or pressure dependent control modes. The VAV terminal controller of the present embodiment also provides an output for either single-stage electric reheat, modulated electric reheat, or modulated hydronic reheat. The complete controller, including the air flow transducer, may be housed entirely outside the casing of the damper motor. This makes the complete device of the present embodiment sufficiently small so that it can be mounted directly onto the damper shaft. Moreover, installing the present embodiment requires a minimal amount of effort, time, and expense.

The VAV terminal controller of the present embodiment includes a Neuron® integrated circuit that provides a complete and embedded interface to the LON®. The LON® includes intelligent devices or nodes that connect by one or more communications devices and communicate with one another using a common protocol. The various locations of a VAV air conditioning system that uses the preferred embodiment may be programmed to send messages to one another in response to various conditions and to take action in response to messages that they receive. The VAV terminal controller of the present embodiment, therefore, is compatible with the protocol for the local operating network. This provides for inter-operability with other LON-based systems. By using fuzzy logic to maintain the desired air flow, the VAV terminal controller of the present embodiment ensures precise and efficient operation and only requires minimal effort to program and commission each VAV terminal.

Figures 1, 6:
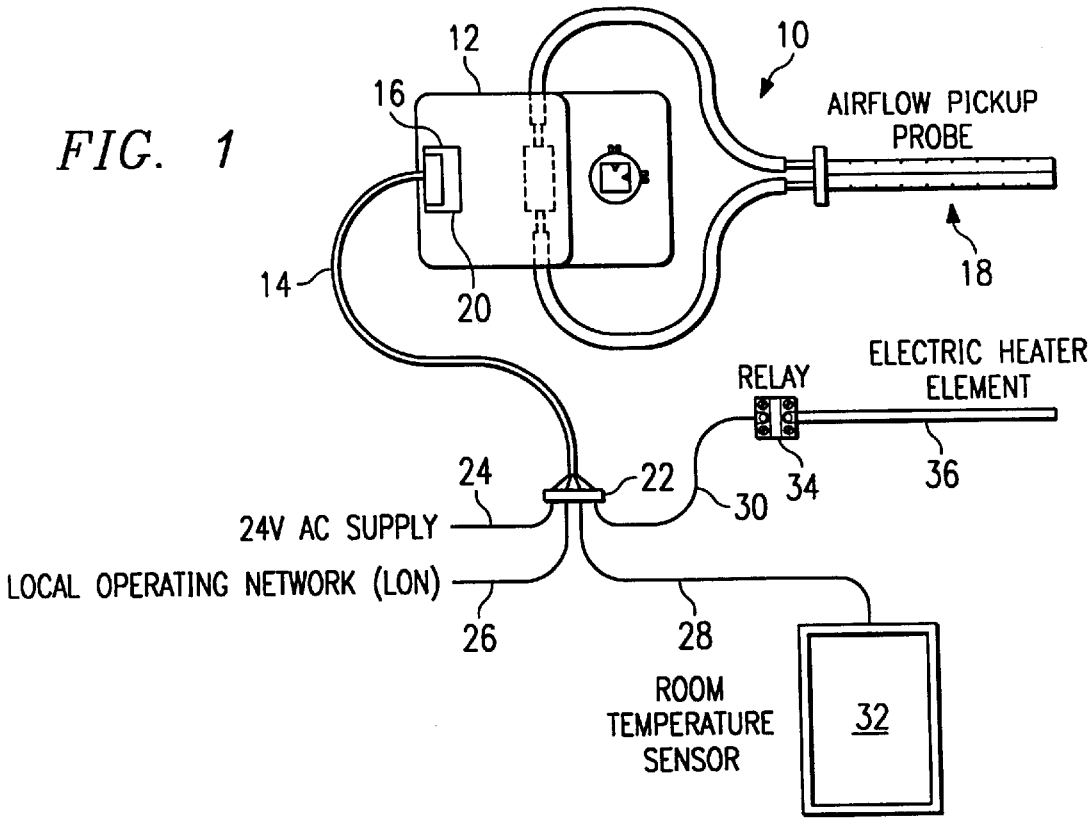

Referring to FIG. 1, there appears VAV terminal controller 10 of the present embodiment that includes terminal controller chassis 12 that receives line 14 and controller switch 16. In chassis 12, airflow pickup probe 18 connects to provide an input relating to the air flow of the VAV terminal damper. Line 14 connects at connector 22 to a number of electrical circuits. For example, through connector 22, line 14 connects to 24 volt AC supply line 24, local operating network connection 26, room temperature sensor connection 28, and electrical heater element line 30. A 24-volt AC supply line 24 provides the necessary power supply to VAV terminal controller 10. Local operating network line 26 communicates with local operating network to communicate with other nodes and servers on the associated network. Room temperature sensor 32 connects to line 14 through line 28. Through line 30, relay 34 connects to electrical heater element 36.

The inputs to VAV terminal controller 10 include a temperature sensor with a 0.05° C. resolution. An airflow transducer within team VAV controller 10 is integral to the circuit. Position of the damper motor is provided by an integral feedback potentiometer. Service switch 16 permits limited local control of VAV terminal controller 10. In addition, three user-configured inputs, either discrete or 0- to 5-volt analog inputs are possible. With these inputs, VAV terminal controller 10 provides three user-configured outputs that are either discrete digital or pulse-width modulated. The outputs can be used for secondary fan, electric heating element, or hydronic VAV control. The damper actuator may be an integral motor output. In addition, the present embodiment may include a status LED to indicate the operation of VAV terminal controller 10. Communication links in the preferred embodiment include a local operating network (LONTalk®) RS485 communication line capable of communicating at a rate of 78 kbs. In addition, the present embodiment provides a LONTalk twisted pair capable of communicating at a rate of 1.2 mbs as an optional communications sensor.

VAV terminal controller 10 is compact and may be positioned on the damper actuator itself. An important aspect of VAV terminal controller 10 that makes this possible is the termination of field connections for inputs such as room temperature sensor 32, power input 24, LON® input 26, and heater element 36 input 30, through a wide range of different options that plug into chassis 12. For example, these terminal connections use simple multicore flying leads with no terminal connections, as well as multicore flying leads that terminate with inexpensive screw-down terminals. Multicore flying lead terminals are also used on the VAV terminal controller 10 printed circuit board (see FIG. 9, below) with an on-board fuse and screw-down terminals. In addition, VAV terminal controller 10 uses a printed circuit board that can be mounted on top of the VAV terminal and that has an on-board fuse, an LED status indication, and screw-down terminals. The combination of packaging innovation with improved connections that VAV terminal controller 10 provides permits exact selection of the type and subsequent cost of the termination technique for a particular VAV application.

Figure 2:
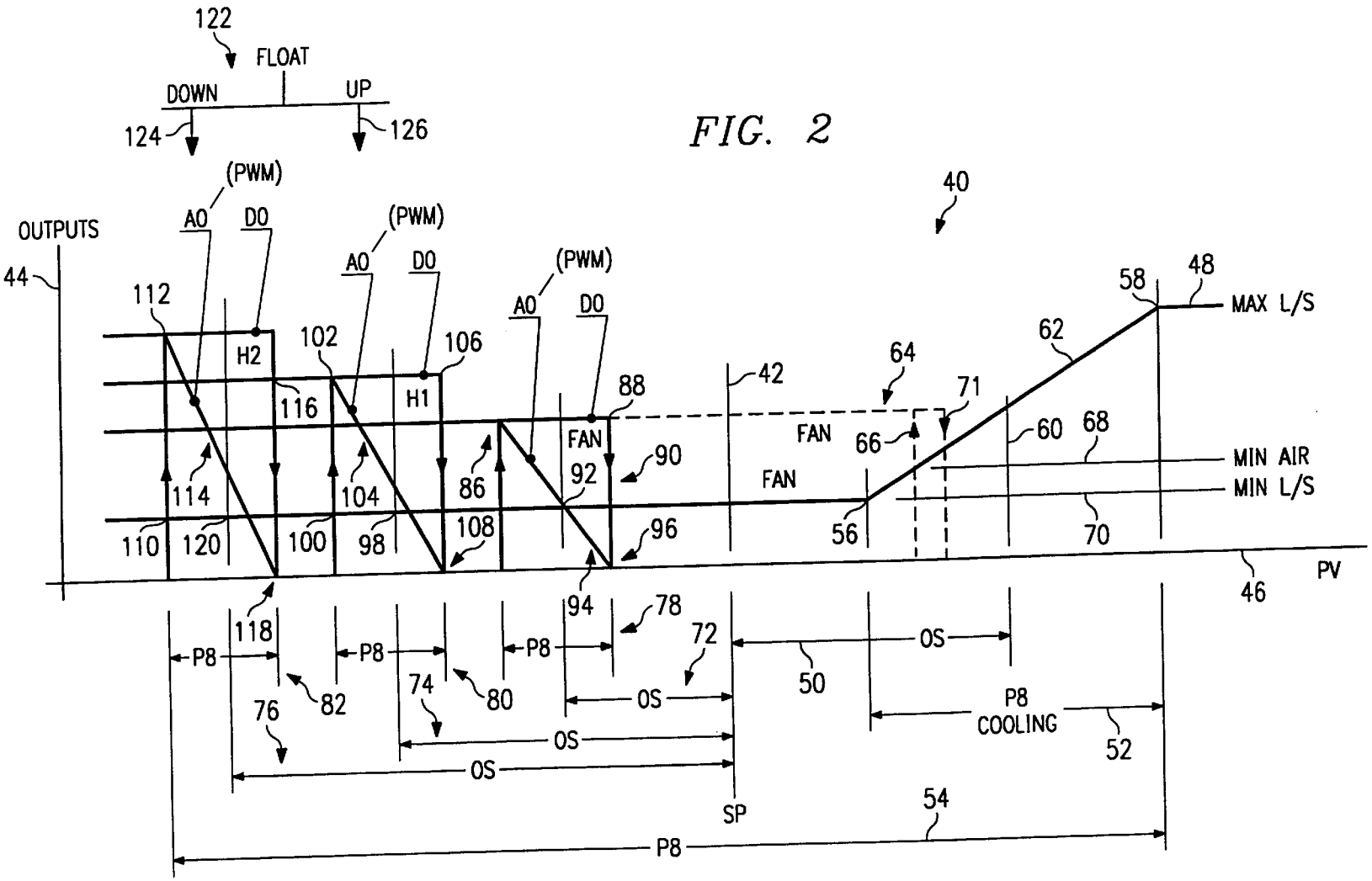
FIG. 2 illustrates the temperature and airflow control characteristic of the present embodiment.

FIG. 2 provides a diagram that illustrates the operation of the present embodiment to control airflow of a VAV terminal for cooling and heating a location within an environment that a VAV air conditioning system serves. In FIG. 2, control diagram 40 depicts the overall strategy that VAV terminal controller 10 implements. Based on setpoint value 42, VAV terminal controller 10 will control either the associated damper actuator motor to provide cooling or a set of heaters and an auxiliary fan to provide heating. VAV terminal controller 10 may include preset default parameters that permit the controller to operate in a stand-alone mode without user intervention. The user, however, may access the process instructions within VAV terminal controller 10 to change configuration parameters via a communications channel. Therefore, the user may edit these configuration parameters if necessary.

In FIG. 2, VAV control diagram 40 for the VAV terminal control strategy shows output axis 44 as a vertical axis plotted against a process variable (PV) axis 46. Airflow line 48 depicts the airflow that occurs through the associated damper. An understanding of VAV terminal controller 10, of the present invention may begin by first viewing airflow line 48 to the right of setpoint line 42. Below PV axis 46 appear three variable regions to the right of setpoint 42. That is, offset line 50 defines a predetermined offset from setpoint line 42 within which the VAV terminal controller has a deadband, i.e., the offset within which no cooling signal comes from VAV terminal controller 10. Furthermore, proportional band (PB) cooling region 52 establishes the cooling band within which VAV terminal controller 10 produces an output that is proportional to the temperature difference above the point where cooling begins. Moreover, process band region 54 defines the entire range of operation for which VAV terminal controller 10 provides an output signal. That portion to the right of setpoint 42 controls the cooling of the location within the environment.

Returning to airflow line 48, to the right of setpoint 42 VAV terminal controller 10 will send an open signal to the damper motor at minimum open point 56 that causes the damper to open. Minimum open point 56 corresponds to the beginning of proportional band cooling range 52. As temperature increases above minimum open point 56, VAV terminal controller 10 will send a proportional signal to the damper motor causing it to open ever wider until maximum open point 58. At maximum open point 58, the damper is fully opened and the maximum airflow through the damper occurs. Maximum open point 58 corresponds to the outer limit of proportional band cooling range 52 which is also the upper limit of process band 54. Thus, from point 56 to point 58 in PB cooling range 52, VAV terminal controller 10 sends a proportional signal to the damper motor, causing the damper to open ever wider until point 58. Offset range 52 determines the position of point 56 at which proportional band cooling begins. Thus, as FIG. 2 indicates, offset may begin at setpoint 42 so that there is essentially no deadband in range to point 60. Note, however, that in the event that the beginning of proportional band cooling range 52 is at point 60, the slope of line 62 will change to a greater value. This may or may not be desirable based on the different control characteristics of the damper motor.

Also to the right of setpoint 42 is auxiliary fan operating line 64. In some VAV terminals, there is an auxiliary fan that circulates air in the location according to predetermined signal values. For example, in the event that airflow in the room falls below a certain value as indicated by line 66, the auxiliary fan will turn on. Horizontal line 68 illustrates where the minimum airflow line causes the auxiliary fan to oscillate. Any airflow below minimum airflow line 68 through the damper will cause the auxiliary fan to operate. Once airflow exceeds minimum airflow line 68, and given a predetermined deadband, operation of the auxiliary fan will begin as vertical line 71 indicates.

In summary, the cooling operations that take place when temperature in the location exceeds setpoint 42 include opening the damper so that airflow follows line 48 through minimum open point 56 and to maximum open point 58 until the maximum airflow occurs. In addition, operation of the auxiliary fan of the VAV terminal corresponds to the signal values in operating a band that line 64 and the associated vertical lines 68 and 72 indicate.

When temperature falls below setpoint 42, VAV terminal controller 10 operates as the process regions to the left of setpoint 42 indicate in VAV terminal control diagram 40. Below PV axis 46, there are offset region 72 that relates to the operation of the auxiliary fan in the VAV terminal, offset region 74 that defines the operation band of a first heater in the VAV terminal, and offset region 76 that defines the operation band of a second heater within the VAV terminal. Proportional band 78 further describes the operation of the auxiliary fan. Proportional band 80 describes the operation of a first heater (hereinafter "HEATER1"). Proportional band 82 describes the operation of a second heater (hereinafter "HEATER2").

As airflow line 48 indicates to the left of setpoint 42, when the temperature falls below point 84 the auxiliary fan operates as line 86 indicates. The auxiliary fan will operate until temperature reaches point 88 where it will turn off as vertical line 90 indicates. Process band 78 determines the different temperatures at which the auxiliary fan on and off signals will occur. Offset region 72 establishes the setpoint 92 about which process band 78 operates. Control of auxiliary fan may be either by a digital signal that controls simply the auxiliary fan on and off condition, or may be through an analog or pulse width modulated (PWM) signal that variably controls the operation of the auxiliary fan. That is, as line 94 indicates, upon being turned on at point 96, the fan will operate at its minimum flowrate. As temperature increases, the pulse width modulated signal will cause an increase in the operation of the fan so that the airflow follows line 94 to a maximum level at point 86 and the reverse action when temperature subsequently decreases.

The operation of HEATER1 about setpoint 98 that offset 74 establishes is similar to the operation of the auxiliary fan about setpoint 92. At setpoint 100, HEATER1 turns on to its maximum level at point 102. Then, based upon whether the signal is invariable or pulse width modulated, signal control to HEATER1 will either follow line 104 or the constant output line to point 106 until power to HEATER1 terminates at point 108. Process band 80 controls this operation. Furthermore, if the temperature in the location continues to drop, a second heater will operate beginning at point 110 to cause HEATER2 to operate at its maximum level 112. Depending on whether variable power control or simply on/off control is imposed on HEATER1, the output of HEATER2 will follow line 114 or continue at full power until line 116 as temperature increases. HEATER2 turns off at point 108. Process band 82 controls the operation of HEATER2 about setpoint 120 which offset 76 establishes.

Diagram 122 illustrates a further control possibility for temperature within a location that the VAV terminal maintains. For example, in some VAV terminals, hot water coils may be placed within the airflow path of the temperature control air. Flow diagram 122 illustrates the operation of the control valve for the heated water that flows through these coils. Thus, when it is desired to flow hot water through the heating coils, a DOWN signal, as indicated at point 124, will occur. As temperature increases above a process band setpoint, VAV terminal controller 10 generates an UP signal to close the hot water supply at point 126. This will terminate hot water flowing through the coils and cease heating the air through the VAV terminal.

The preferred embodiment of the invention provides the necessary control instructions that control the damper motor to move the associated damper and vary the air volume controlling temperature around setpoint 42. Circuitry and associated hardware and instructions of VAV terminal controller 10 receive three analog or digital inputs, produce three analog (PWM) or digital outputs, one temperature input, one communications or local area network (LAN) input, and internal connections to the damper actuator motor and damper position feedback potentiometer. Each of the three inputs may be defined as being either an analog or digital input. In the analog mode, VAV terminal controller 10 converts a voltage between the range of 0 to 5 volts, in the preferred embodiment, to a value of 0 to 100%. Other conversion coefficients may be used depending on the particular application. For example, the present embodiment is designed to interface the S7000-Inet system manufactured by Control Systems International of Carrollton, Tex. Inputs enabled as digital can accept a voltage in the range between 0 and 34 volts DC with any voltage above 60% of 5 volts being taken as a state of 1 and any voltage below 40% of 5 volts begin taken as a state 0. When enabled, the three inputs may also function as interlocks to a digital output stage and a fire mode input. In the preferred embodiment, AI/DI_0 provides an interlock to digital output 1, AI/DI_1 is the interlock to digital output 2, AI/DI_2 is the fire mode input. The inputs are selected to be digital inputs by defining the input as DI or DA at the unit control interface (UCI). To configure the input of analog, it is possible to define the point as an analog input at the UCI.

Three outputs may be configured to operate as digital outputs or as analog (PWM) output or as floating drive output. This may be selected by defining the point as either a digital output or analog (or PWM) output at the UCI. In a digital mode, the output can either drive the DC load of 24 volts at 200 milliamps or an AC load of 24 volts at 600 milliamps continuous (with an 8 amp surge for one cycle). The DC configuration is rated to drive RH1V relays as used in EMS RDB08 cards, manufactured by EMS Control Systems of Osborne Park, Western Australia. The AC configuration drives an AC contactor such as the AB100-A09NK, the LC1 D09 10 manufactured by Telemechanique, or the LY2 240VAC relay manufactured by OMRON directly. The AC or DC configuration, however, is to be specified at the time of manufacture for the preferred embodiment.

When the output is defined to be an analog output, the output will pulse width modulate from 0% to 100% of the user-defined pulse time. For example, for a pulse time defined as 25 seconds and an output value of 32%, an output will be ON for 8 seconds and OFF for 17 seconds. This option is useful for proportionally controlling HEATER1 and HEATER2 using a solid state relay. Again, the outputs can be manufactured as either an AC or DC drive. Two auxiliary connections exist on the connector card to provide a source voltage for driving solid state relays. When configured as a floating drive, the digital output DO_1 acts as the open/up drive output and the digital output DO_2 is the closed/down drive output.

The temperature sensor input connects to the two leads of a sensor operating in a current mode. For example, the preferred embodiment connects to an AN592 sensor operating in the current mode to measure temperatures over the range of 0° to 75° C. In one embodiment, the input provides short-circuit protection.

Communications with VAV terminal controller 10 is through the communications connection 26. This connects to an RS485 network that uses the LONTalk protocol. All editing and monitoring of the operating conditions is via this channel. VAV terminal controller 10 in the preferred embodiment is powered by a 24 volt AC at 160 milliamps power source. VAV terminal controller 10 further provides a service switch that may be used with a hand-held console to assign a unit number to each VAV terminal controller in a VAV air conditioning system. This will permit single hand-held console control to all VAV terminal controllers in the VAV air conditioning system.

In the present embodiment, the damper actuator is connected internally to the VAV terminal controller 10, with the UP/DOWN outputs available to the user as points. A feedback potentiometer from the damper is also internally connected to VAV terminal controller 10. This input provides information on the damper position, but is not used, in the preferred embodiment, to determine a control in the damper position. Airflow measurements are done via on-board flow sensor 18 through the air pick-up probe. Two connections are made to the high and low pressure inputs from airflow velocity pick-up probe 18.

In the preferred embodiment, any of the input points may be placed into test and override conditions. Any of the output points may be placed into manual or event-initiated output-with-lock and override. VAV terminal controller 10 retains these operating conditions, even during a power-down cycle, until commanded otherwise.

Figure 3:
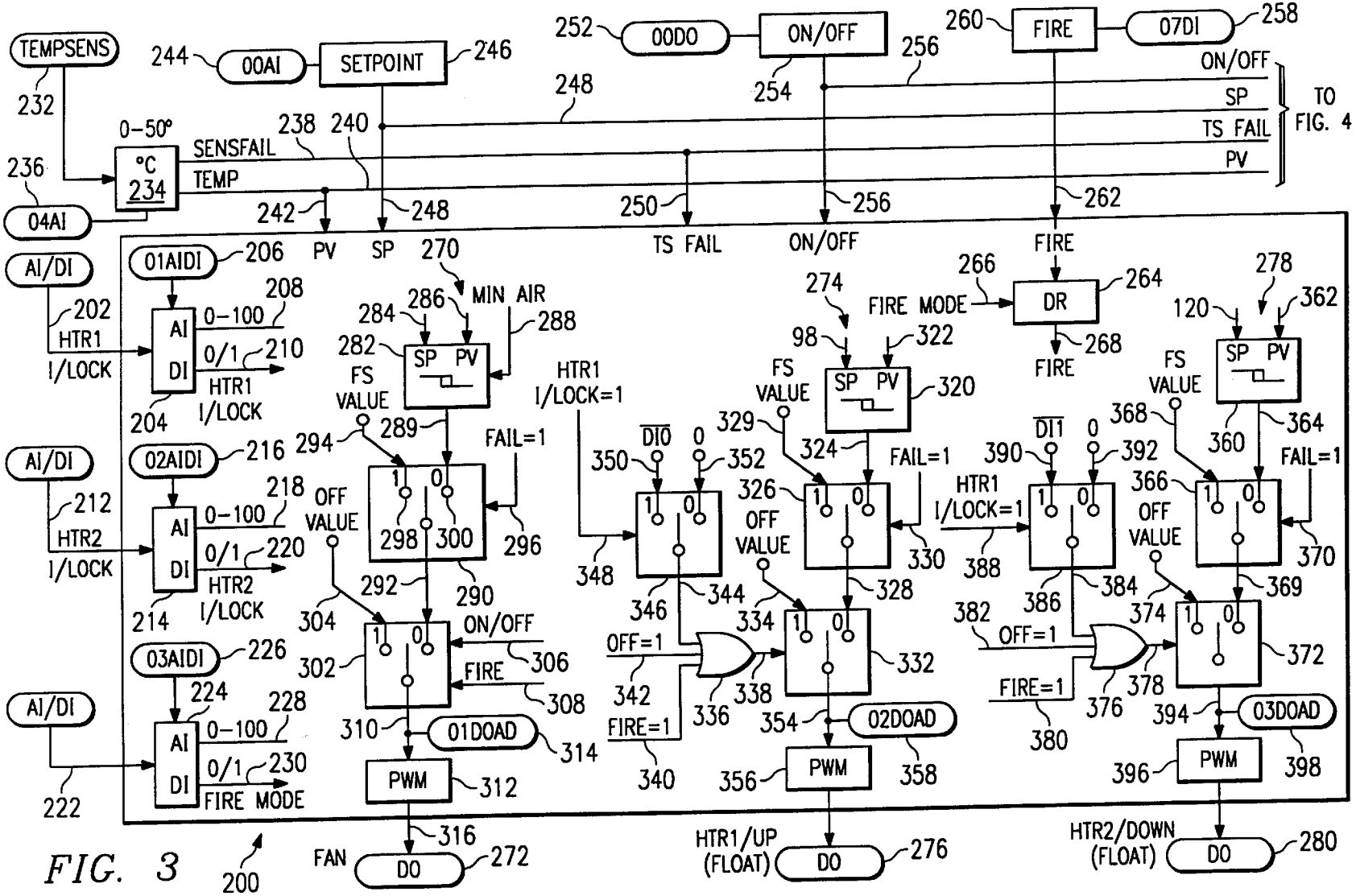

To illustrate how the present embodiment achieves these results, reference is now made to FIGS. 3 through 6 which illustrate the inputs, outputs, and process control that the present embodiment provides. Beginning with FIG. 3, there is provided a description of the controls of the auxiliary fan, HEATER1 and HEATER2 within the VAV terminal in response to various inputs. FIG. 3 shows the above-described analog and digital inputs together with the analog and digital outputs to the auxiliary fan, HEATER1, and HEATER2, as appropriate.

In particular, FIG. 3 shows block 200 that controls the operation of VAV terminal controller below setpoint 42 of FIG. 2. Inputs to the VAV terminal controller 10 provides and includes AI/DI input 202 for a heater analog that goes to the submodule 204. In addition, AI/DI submodule 204 receives 01AIDI input 206 that controls whether AI/DI module outputs analog 0 to 100% signal 208 or digital 0 or 1 signal 210. AI/DI module 214 receives AI/DI HEATER1 interlock input 212 and 02AI/DI input 216. AI/DI module 214 provides an analog output 218 or digital output 220. Heating control module 200 also receives input 222 into fire mode submodule 224. Based on 03AI/DI input 228, fire mode submodule 224 will produce either a variable or PWM output 228 or digital output 230 within heating control module 200.

Heating control module 200 of the present embodiment also receives a temperature sense signal 232 that temperature conversion submodule 234 uses to generate a temperature value. Input 04AI 236 provides an analog input to temperature conversion submodule 234. Temperature conversion submodule 234 provides two output signals including sensor fail output 238 and temperature output 240. Temperature value 240 is input to heater module 200 at process variable (PV) 242. In the present embodiment, 00AI input 244 goes to setpoint submodule 246. Setpoint submodule 246 provides the SP input 248 to heater control module 200. Sensor fail signal 238 from temperature conversion submodule 234 provides temperature sense fail input 250 to heater control module 200. Digital 00DO input 252 goes to on/off submodule 254 to provide on/off input 256 to heater control module 200. In addition, digital input 258 goes to fire submodule 260 to produce fire input 262. Fire input 262 goes to DR submodule 264, as does fire mode input 266 to produce fire signal 268. Fire signal 268 is used within heater control module 200 to produce output for the auxiliary fan, the first heater, and the second heater.

Further processing within heater control module 200 includes operation of the control algorithm, and processing the input values, to produce the output control signals for the auxiliary fan, the first heater or up float control signal, as well as the down float or second heater control signal to control the amount of heating that takes place in air flowing through the VAV terminal. In particular, flow diagram 270 describes the operations for producing fan control signal output 272. Flow diagram 274 describes the operations for producing heater one or up float signal 276. Flow diagram 278 shows the instructions and the operation for producing heater two or down float control signal 280.

In fan flow diagram 270, submodule 282 performs the operation described in FIG. 2 for the auxiliary fan of the VAV terminal within process band 78. Thus, submodule 282 receives as inputs a setpoint value 284 and a process variable input 286, together with a minimum airflow input 288. Based upon these inputs, submodule 282 will generate a signal as input 289 indicating whether or not the auxiliary fan should receive a signal to turn on. Signal 289 goes to relay 290, which may be an instruction set performing a relay function. Relay 290 also receives a fail safe (FS) value 294 and a FAIL signal flag 296. Module 290 includes a selector mechanism for selectively receiving a 1 value at point 298, a 0 value at point 300, or an interrupt fail signal that FAIL signal flag 296 reflects. Relay 302 receives input signal 292, OFF value signal 304 and ON/OFF input 306. In addition, in the event of a fire within the VAV terminal controller, submodule 302 receives fire input signal 308. Output signal 310 from relay 302 goes to PWM submodule 312. In addition, 01DO/AO signal 314 goes to PWM module 312 to indicate whether PWM module 312 should output a digital output or an analog output. PWM submodule 312 produces PWM output 316 that goes to the auxiliary fan of the VAV terminal as input 272.

The diagram 274 illustrates the steps that heating control module 200 performs in generating output 276 to HEATER1 for an UP FLOAT input 276. Beginning at submodule 320, setpoint value 98 and process variable value 322 go to submodule 320. Submodule 320 performs the steps discussed in FIG. 2 in association with process band 80 about setpoint 98. Submodule 320 provides output 324 to relay 326. Relay 326 also receives FS value flag 239 and FAIL flag 330 to generate output 328. Output 328 goes to relay 332. Relay 332 receives OFF value input 334 and OR-gate 336 input 338. OR-gate 336 receives a FIRE flag input 340 and OFF flag input 342, as well as output 344 from relay 346. Relay 346 generates output 344 in response to a HEATER1 interlock flag 348. The $\overline{\text{DI0}}$ input 350 and the 0 input 352. Thus, relay 332 receives input 338, OFF value 334, and input 338 from relay 326 to produce output 354. Output 354 goes to PWM module 356, as does 02DOAO input 358. The 02DOAO input 358 indicates to PWM submodule 356 whether to generate an analog (PWM) or digital output. Thus, depending on the type of output that PWM submodule 356 is to generate, output 276 will go to either HEATER1 or UP float valve of the VAV terminal.

Flow diagram 278 indicates the steps that heater control module 200 performs to generate output 280 to HEATER2 or the DOWN float valve controller for the VAV terminal. Beginning at submodule 360, setpoint 120 provides an input as does PV value 362. PV value 362 and setpoint 120 are processed by submodule 360 to generate output 364. Output 364 goes to submodule 366 as does fail safe value 368 and fail flag 370. Relay 366 produces an output 369. Output 369 goes to relay 372, as does OFF value 374 and the OR-gate 376 output 378. OR-gate 376 receives three inputs including FIRE flag input 380, OFF flag input 328, and output 384 from submodule 386. Relay 386 receives HEATER2 interlock flag 388, DI_1 input 390, and 0 flag input 392. Therefore, relay 372 takes input 369 from relay 366, OFF value 374, and output 378 from OR-gate 376 to produce output 394 to PWM submodule 396. In summary, therefore, heater control module 200 produces fan input 272, HEATER1 (or UP float) input 276, and HEATER2 (or DOWN float) input 280 based on the predetermined setpoint values together with the actually sensed process variable values described in FIG. 2. Each output that the heater control module 200 produces is associated with a configuration table that defines the various operating parameters for the heating function of the VAV terminal.

As stated above in connection with heater control module 200, various operating parameters are used. The preferred embodiment uses the following definitions for the these operating parameters:

PWM PERIOD—This is the total period of the output when it is functioning as a PWM output, or for operating in the floating mode it is the total valve time for valve operation.

SETPOINT OFFSET—This is the offset of the VAV setpoint and defines the temperature around which this output operates.

FAIL SAFE (FS) VALUE—This is the value this output is to assume should the temperature sensor fail (i.e., exceed the 0° to 50° C. range).

PROPORTIONAL BAND—This is the temperature range over which this output modulates in the PWM mode or, in the digital mode, the deadband within which the output operates.

DELAYED TILL ON—This is the time after the previous output stage has gone to a state of 1 before this stage goes to a state of 1.

LOGIC/PWM—This is an internally stored state based on whether the output is an analog output or digital output.

OFF VALUE—This is the value/state that the output will assume if the ON/OFF point is off or the fire point is active.

FIRE MODE/ILOCK—This defines if AI/DI2 will operate as a fire mode input signal, and for AI/DI0 and AI/DI1 whether they will provide the interlock signals to the subsequent DO stages.

FREE/ENGAGED—This specifies if the digital output is to derive its output from the control module or to be uncommitted and just follow any point control command from the UCI.

FLOAT/MOD—This is relevant to DO_1 only and defines whether in the analog output mode if outputs DO_1 and DO_2 are to be individual PWM output or if they are to act in conjunction as a floating output control.

MAX VALUE—This defines the maximum that the associated outputs can assume during operation.

MIN VALUE—This defines the minimum value that the associated outputs can assume during operation.

Also shown in FIG. 3 with the output are modifiers that take effect in certain circumstances. Thus, for DO_0, if the value of min air is non-zero, then this will provide an override as to when to turn on if the measured airflow is below this value. For all outputs, if the temperature sensor fails, a default FAIL SAFE value will be used by that output. For DO_0, if the ON/OFF point is off all the FIRE state is on then and OFF value will be used by the output. For DO_1 and DO_2, and enabled interlock signal of 0 will also cause these outputs to use the OFF value.

TABLE 1 shows parameters for the various modules of the present embodiment.

TABLE 1

Internally Resident VAV Terminal Points

| PARAMETER | DEFINITION |
|---|---|
| 00DO | VAV ON/OFF |
| 01AO/DO | Hardware output 0 (typically the auxiliary fan output) |
| 02AO/DO | Hardware output 1 (typically the HEATER1 or float up output) |
| 03AO/DO | Hardware output 2 (typically the HEATER2 or float down output) |
| 04DO | Warm-up mode |
| 05AO | Actuator desired position (0 to 100%) |
| 07AO | LPS setpoint (from LPS setpoint module) |
| 00AI | Setpoint from UCI |
| 01AI/DI | Hardware input 0 (typically HEATER1 interlock) |
| 02AI/DI | Hardware input 1 (typically HEATER2 interlock) |
| 03AI/DI | Hardware input 2 (typically fire mode input) |
| 04AI | Space temperature (from temperature sensor) |
| 05AI | Damper position from feedback potentiometer |
| 06AI | Airflow (liters per second from airflow sensor) |
| 07DI | Fire mode (fire mode control from UCI) |

FIG. 4 illustrates the operation of liters per second module 400 that generates a liters per second setpoint based on the temperature setpoint at space temperature. Liters per second (LPS) setpoint module 400 uses the following parameters:

PROPORTIONAL BAND—This is the temperature band over which LPS setpoint module 400 is to scale.

SETPOINT OFFSET—This is the temperature offset from the VAV setpoint around which the proportional band is to operate.

FAIL SAFE VALUE—This is the LPS setpoint module 400 setpoint value that the VAV terminal is to assume if the temperature setpoint fails.

MIN L/S—This is the minimum liters per second setpoint value that LPS setpoint module 400 is to generate when the temperature is at the low end of the proportional band.

MAX L/S—This is the maximum liters per second setpoint value that LPS module 400 generates when the temperature is at the upper end of the proportional band.

DIRECT/REVERSE—This flag defines whether the liters per seconds setpoint is to increase from MIN L/S to MAX L/S as the temperature increases or if the liters per second setpoint is to decrease from MAX L/S to MIN L/S as the temperature increases in a UCI point "warm-up" modifies the DIRECT/REVERSE action of LPS setpoint module 400 to provide an early morning form of operation. The warm-up point derives its state only from the UCI.

OFF VALUE—This is the liters per second setpoint value that LPS setpoint module 400 outputs when the VAV ON/OFF point is off.

MIN AIR ON—This is the airflow value below which DO0 will turn on. A value of 0 defines that this feature is inactive.

MIN AIR OFF—This is the airflow value above which DO0 will turn off.

The LPS setpoint value that LPS setpoint module 400 generates is made available to the UCI and can be placed into manual or output with lock control from the UCI. Thus, with particular reference to FIG. 4, LPS setpoint module 400 receives ON/OFF input 256 from ON/OFF submodule 254, temperature sense (TS) fail input 238 from temperature conversion submodule 234, setpoint input 248 from setpoint submodule 246, and process variable input 240 from temperature conversion submodule 234. LPS setpoint module 400 also receives values for the proportional band as block 402 indicates, setpoint offset as block 404 indicates, FS value as block 406 indicates, a MIN L/S value as block 408 indicates, a MAX L/S value as block 410 indicates, a DIRECT/REVERSE flag value as block 412 indicates, an OFF VALUE flag as block 414 indicates, a MIN AIR ON value as block 416 indicates, and a MIN AIR OFF value as block 418 indicates.

From DIRECT/REVERSE block 412 the DIRECT/REVERSE flag, as arrow 420 indicates, goes to COR submodule 422. COR submodule 422 also receives a warm-up signal from DIRECT/REVERSE warm-up submodule 424. DIRECT/REVERSE warm-up submodule 424 provides input to COR submodule 422 in response to the value of the warm-up mode 04DO control signal 426. Thus, COR submodule 422 outputs to LPS value submodule 430. LPS value submodule 430 receives PV input 240, setpoint input 248, and DIRECT/REVERSE flag value 420 from COR submodule 422. LPS value submodule 430 produces LPS output 432 according to instructions that perform the operations that plot 434 indicates. In plot 434, process variable 240 is treated as an independent variable that produces value for the LPS variable as a dependent variable. Plot 434 includes setpoint 248 and proportional band 402. As process variable 240 increases from a value at the origin of plot 434, depending upon whether DIRECT/REVERSE flag 420 is operating in the direct or reverse mode, the LPS value will change according to line 436 or 438, respectively. That is, if DIRECT/REVERSE flag 420 indicates that LPS value submodule 430 is to operate from in the direct mode, as PV 240 increases, the LPS value will change from a minimum LPS value 408 to a maximum LPS value 410. On the other hand, if DIRECT/REVERSE flag 420 indicates that LPS value submodule 430 is to operate in the reverse mode, then as PV 240 increases LPS value 432 will follow line 438 to range from MAX L/S value 410 to MIN L/S value 408. Operating in the direct mode, and in proportional band 402, as PV 240 increases, LPS value 432 will increase proportionally. On the other hand, if operating in the reverse mode according to line 438, as PV 240 increases, LPS value 432 will decrease proportionally.

Submodule 440 produces an output 442 to L/S setpoint submodule 444. Submodule 440 operates in the event that the temperature sensors fail parameter 238 indicates a failure in the temperature sensor. If the temperature sensor has failed then relay 440 will take the value of FS value 406 and send that to L/S setpoint submodule 444. From L/S setpoint submodule 444, outputs go to LPS setpoint indicator 446 which is at the VAV terminal and as parameter value 448 for use in fuzzy logic control module 450 of FIG. 5.

In FIG. 4 also appears a block diagram of fuzzy logic control module 450 that drives the actuator for the damper in the VAV terminal. Based on the LPS set point 448 and a measured air flow determination from airflow sensor 18 (see FIG. 1), fuzzy logic control module 450 provides an output signal to motor logic module 452. With reference to fuzzy logic control module of FIG. 5, the following parameters are defined:

N—This is the conversion coefficient based on the duct size, air-flow factors, and air density to convert the sensed airflow pressure in Pascal to a liters per second value.

OFF VALUE—This is the position that the actuator is to assume when the VAV ON/OFF point is off.

With these definitions, it can be understood that fuzzy logic control module 450 receives LPS set point 448 from LPS setpoint module 400 and ON/OFF input 256 from on/off submodule 254. In addition, fuzzy logic control module 450 receives a flow sensor parameter value 454 from air flow pick-up probe 18, which pressure value submedial 456 converts to a pressure reading. From airflow pick-up probe 18, submodule 456 produces a pressure differential value. Within fuzzy logic control module 450, pressure submodule 458 produces an LPS sensed value to air flow submodule 460.

The LPS value that submodule 458 produces takes into consideration the property that the airflow is proportional to the square root of the differential pressure across air flow pick-up probe 18. The value of m is determined and is constant for a given VAV terminal. Airflow submodule 460 displays the actual LPS value as 06AI input value 462. In addition, the actual liters per measured operates as the process variable (PV) for fuzzy control submodule 464 of fuzzy logic module 450. Fuzzy control submodule 464 receives LPS setpoint 448 and, using a set of predetermined rules produces an output percentage value 466. Relay 468 sends output 470 from fuzzy logic control module 450 to motor logic submodule 452 based on the status OFF flag 472. If the OFF flag equals 1, then from OFF VALUE program element 474, OFF VALUE 476 goes to interlock 468. Interlock 468, in this instance, sends OFF VALUE to motor logic submodule 452. If the OFF flag equals 0, then the output percentage value 466 passes through interlock 468 to motor logic submodule 452. Motor logic submodule 452 converts the output percentage from fuzzy logic control module 450 to a control signal for motor 478 of the damper associated with the VAV terminal. That is, the output percentage 466 is the desired percentage opened for the damper of the VAV terminal.

Motor logic submodule 452 converts this percentage to either DRIVE UP signal 486 or DRIVE DOWN signal 488 based on the existing position of the damper in the VAV terminal. The Neuron® processor 452 absolutely calculates the position to which motor 478 moves the damper based on actual synchronous drive signals that motor 478 receives. See FIG. 7, below, and accompanying description. In response to DRIVE UP signal 486 or DRIVE DOWN signal 488, motor 478 will move the position of the damper. Potentiometer 490 may also measure the position of the damper. Motor logic submodule 452 also sends a signal to compare submodule 492 of fuzzy logic control module 450, as does potentiometer 490.

Compare submodule 492 compares the motor logic submodule 452 value for the desired damper position to the actual damper position that the Neuron® processor calculates. In the event that there is a greater than 20% difference between the desired damper position and the actual damper position, compare submodule 492 sends a damper fail signal to damper fail submodule 494. Damper fail submodule 494 will indicate to VAV terminal controller 10 that a damper fail condition exists. To further aid in the monitoring of the VAV terminal damper, output 470 from interlock 468 goes to motor desired submodule 496. Motor desired submodule 496 produces 05A0 output 498 that VAV terminal controller 10 may display. To display the actual damper position, potentiometer 490 sends a measurement signal to motor actual submodule 500. Motor actual submodule 500 produces 05AI signal 502 to display the actual position of the VAV terminal damper.

The desired motor position signal that fuzzy logic control module 450 generates is a percentage (0 to 100%) value that goes to motor logic submodule 452. Motor logic submodule 452 then drives either the up or down motor on the damper actuator to desired damper position. Motor logic submodule 452 uses an internal algorithm that precisely and accurately counts the synchronous pulses of the up/down motor. As each pulse is directly related to the absolute position, motor logic submodule 452 may accurately position the damper actuator without the need for the feedback potentiometer (i.e., potentiometer 490). Feedback potentiometer 490 initially strokes the damper motor 478 the first time that VAV terminal controller 10 receives power. Thereafter it is used for informational purposes only (e.g., failure of the motor and/or its linkage). The position of the algorithm is unique in controlling these types of motors and includes techniques of storing the motor position during power outages.

Fuzzy logic control module 450, therefore, compares the LPS setpoint value 448 with the measured airflow 460 and calculates a new desired position 470 for motor 478. This is done by determining the difference between the desired airflow and the actual airflow as well as the difference between the change and the airflow from the last sample kind. These values are then used to locate a point in a fuzzy logic real-based weight matrix and determine what influence they will have on the various output consequence degrees of membership. From this, a change in the desired motor position is acquired and added to the current desired position because motor logic submodule 452 to send the appropriate drive up 486 or drive down 488 signal to motor 478.

Fuzzy control submodule 464 may include a number of fuzzy logic algorithms for implementing the preferred embodiment. For example, those described in B. Kosko, Neural Networks and Fuzzy Systems: A Dynamical Systems Approach to Machine Intelligence, Englewood Cliffs, N.J., Prentice Hall, 1992, and B. Kosko, Fuzzy Thinking: The New Science of Fuzzy Logic, New York, N.Y., Hyperion Press, describe various fuzzy logic algorithms that the present embodiment may employ. Based on these algorithms, coefficients may be defined and a weight matrix may be formed to provide the necessary weights upon which the fuzzy logic algorithm may operate. For purposes of the present invention, the above-cited references are herein incorporated by reference. The weights and weight matrix that the preferred embodiment employs are shown respectively in FIGS. 5 and 6. The following discussion details more explicitly the operation of the preferred embodiment to perform the necessary fuzzy control steps.

In one embodiment of the present invention a hand-held console may be used that communicates with the VAV terminals over the LON in a basic format allows the user to set the VAV terminal unit address and calibrate the temperature sensor, the airflow sensor in pascals, and LPS actuator for the VAV terminal damper. The hand-held console permits setting the VAV unit address by allowing the user to select and enter the address of the VAV into the hand-held console. The user then pushes a service button on the VAV and the hand-held console establishes the VAV terminal address. Calibrating the temperature sensor is done by entering the real temperature into the hand-held console and selecting a calibrate function that the hand-held console provides. Calibrating the airflow sensor in pascals may be done in both the low end and the high end. The low end calibration of the Pascals value, below 50 Pascals, is entered directly into the hand-held console and the user selects the calibrate function. High end calibration is performed in a similar fashion, but requires value greater than 150 Pascals to be entered. Calibrating the airflow sensor in liters per second is done by entering the true liters per second value and entering the calibrate command. The VAV back-calculates the appropriate Pascal value for the given flow and conversion coefficient and then uses this in its subsequent flow calculations. It should be noted that this is for small investments in calibration only. It cannot be used as a means of bypassing the conversion coefficient input. This is because large changes affect the granularity of the measured Pascal values. By selecting the actuator calibrate function, VAV terminal controller 10 will run the damper fully open for 130 seconds. Then, VAV terminal controller 10 will run the damper in the closed position until it no longer detects any damper movements. The VAV terminal controller 10 defines the fully opened position as 100% and the closed end stop at 0%.

Figure 7A:
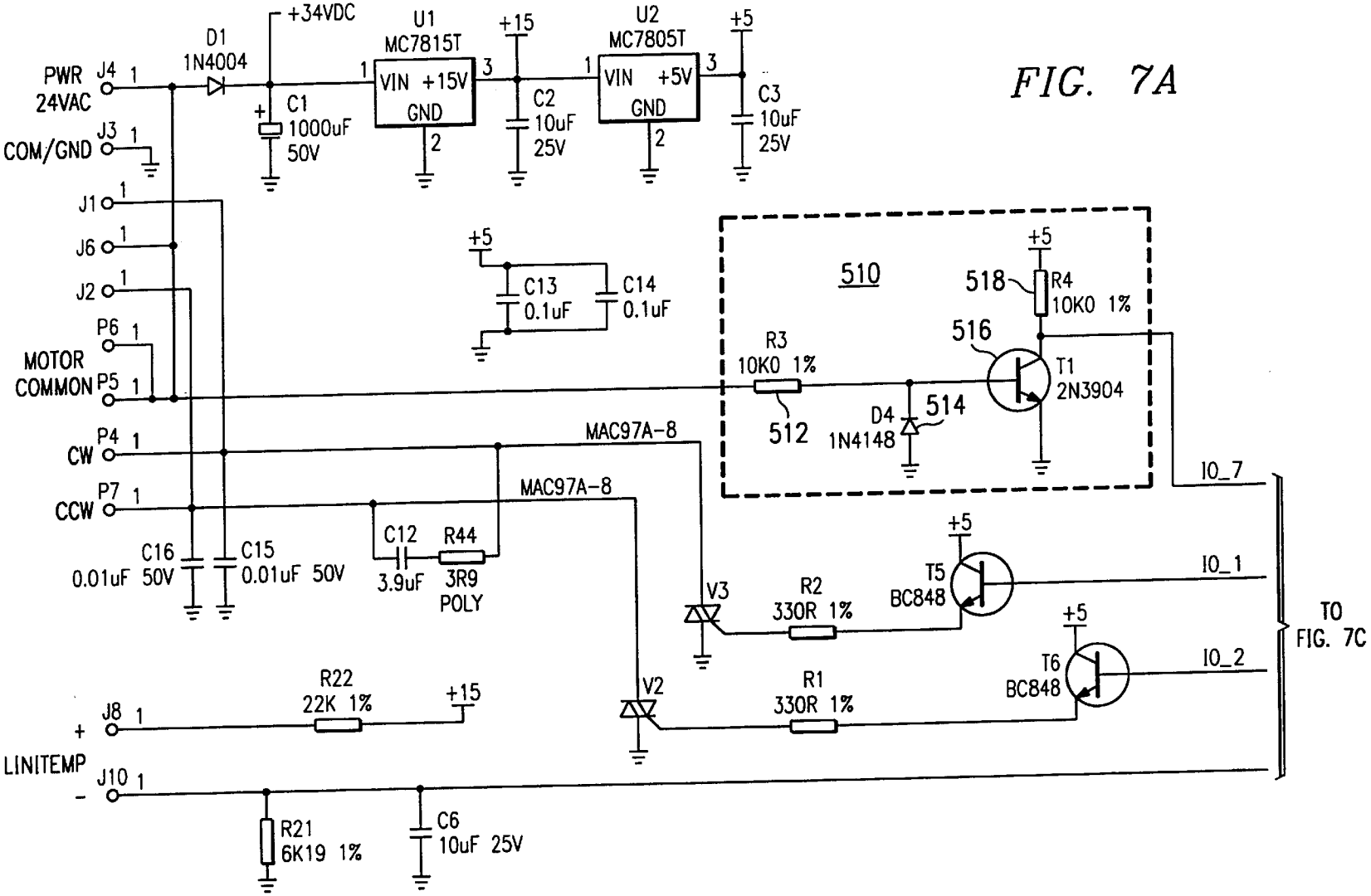
FIGS. 7, 8, and 9 illustrate various aspects of the electronic circuitry for implementing the present embodiment of the invention.
Figure 7B:
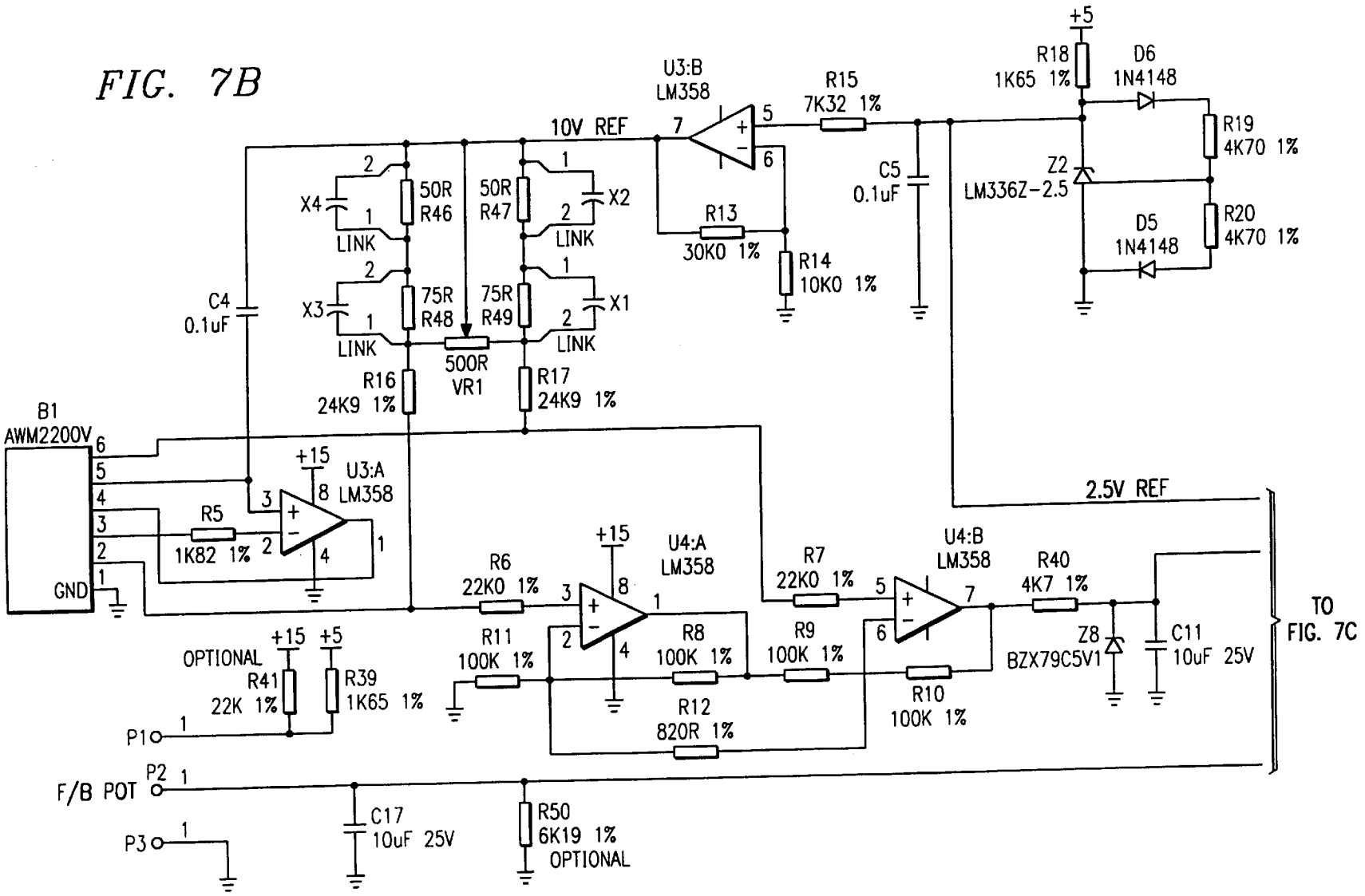
Figure 7C:
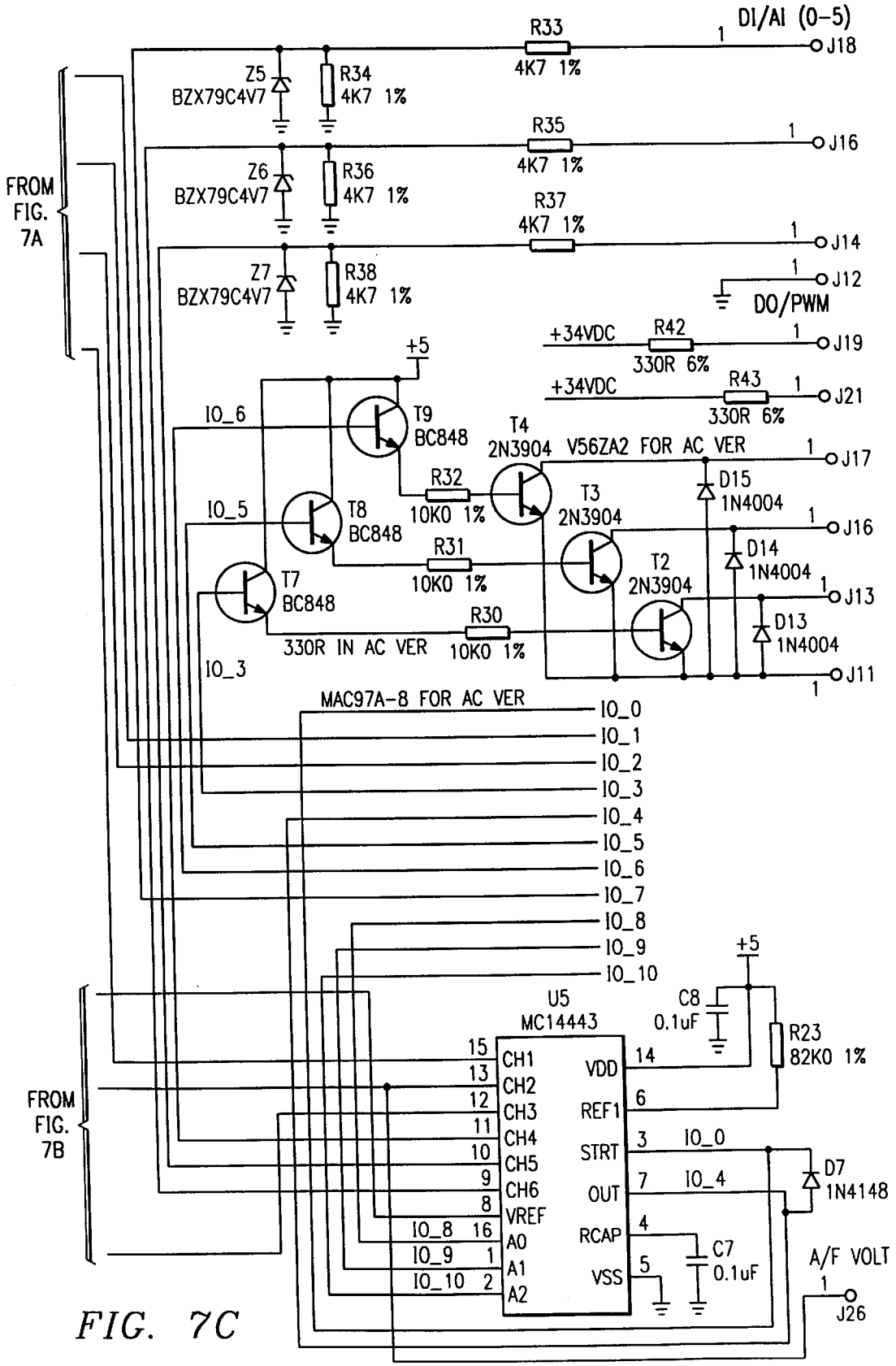
Figure 8:
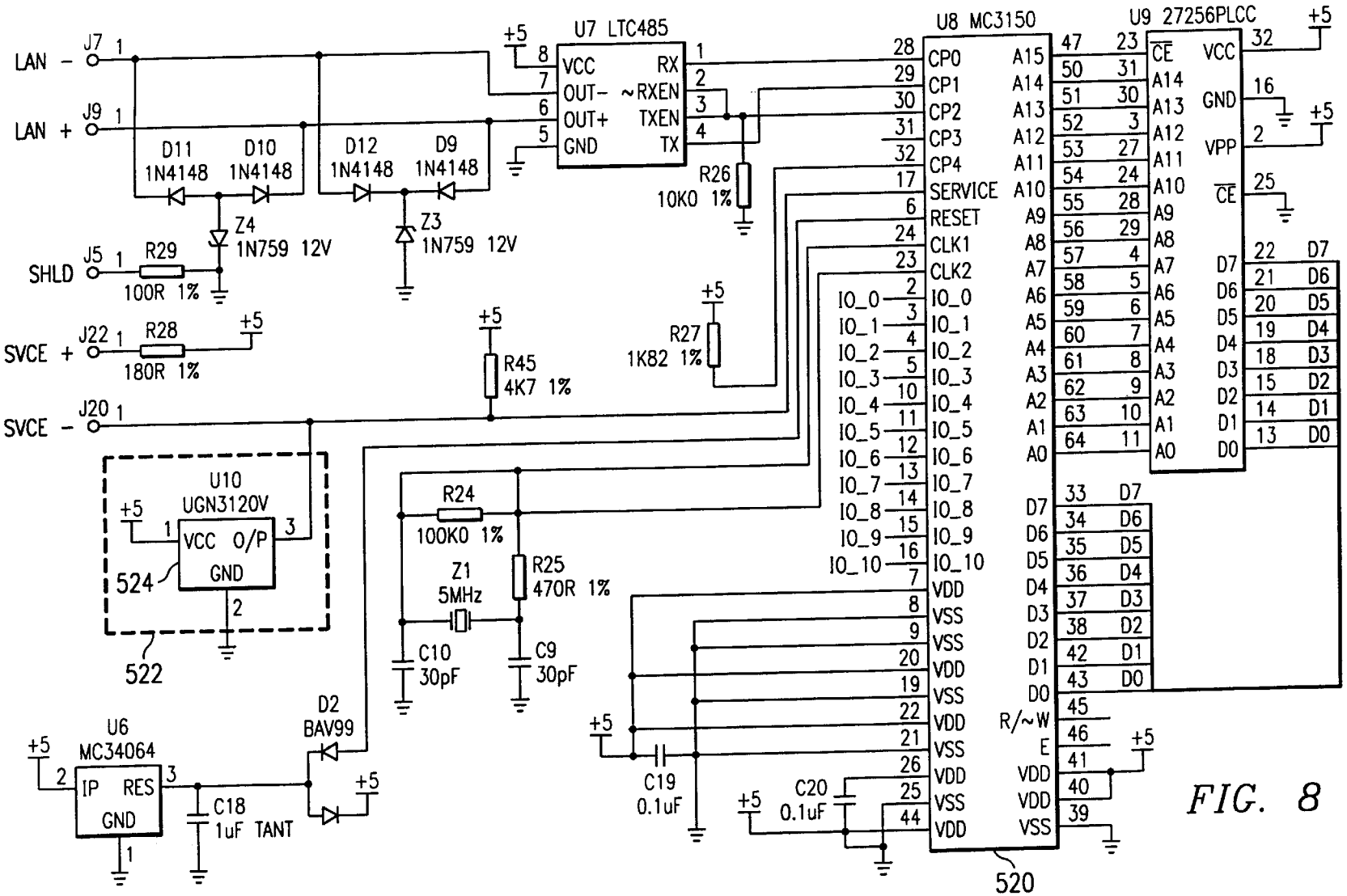
Figure 9:
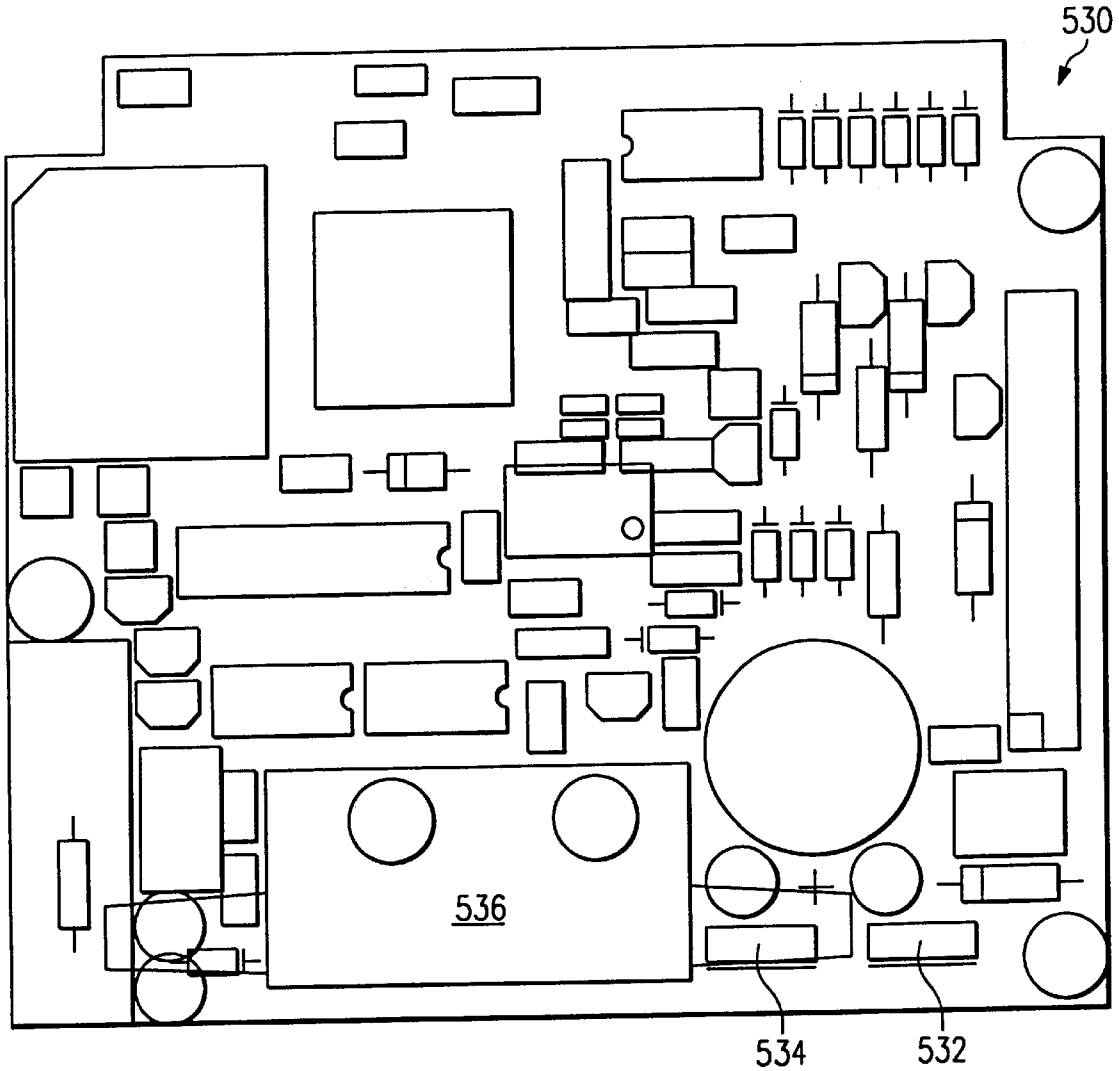

FIGS. 7, 8, and 9 illustrate the circuitry and printed circuit board layout of the hardware that supports the above-described process for VAV terminal controller 10. In particular, FIGS. 7 and 8 illustrate circuit diagrams that represent the various logical circuit components that form the present embodiment. Although the circuitry of FIGS. of 7 and 8 is apparent on inspection of FIGS. 7 and 8, certain aspects of the associated circuitry warrant specific mention.

For example, within dashed line 510 of the circuitry in FIG. 7 appears a subcircuit including resistor 512, diode 514, transistor 516, and resistor 518. Subcircuit 510 performs the function of tracking the position of the damper by generating a signal that the Neuron® in U8 processor 520 of FIG. 8 can use to count the number of alternating current cycles as they occur in the main 24-volt power supply to VAV terminal controller 10. In the present embodiment, motor 478 is a synchronous motor, and so its operation is synchronous to the alternating current existing across its main windings. The present embodiment, for example, equates six cycles of alternating current to one revolution of motor 478. Because of the synchronous nature of motor 478, it is possible to keep track of the number of turns that motor 478 takes by simply counting the number of alternating current cycles that it receives.

In the present embodiment, it may be further determined that taking the damper from fully closed to fully opened requires a certain number of revolutions of motor 478. By determining the number of motor 478 revolutions necessary to take the damper from a fully closed to a fully opened position, it is possible to determine the time necessary to open the damper to intermediate positions between fully opened and fully closed. For example, if the damper requires 90 seconds to go from fully closed to fully opened with 50 cycle alternating current, it can be determined that the requirement for 4500 cycles of alternating current (or 750 revolutions of motor 478) are necessary to take the damper from the fully closed to the fully opened position. Since this relationship is linear, to open the damper from a fully closed position would require one-half this number, or 2250 voltage cycles to motor 478. It is possible, therefore, with the present embodiment to precisely control the position of the damper by precisely controlling and accounting for the amount of time that alternating current voltage is delivered to motor 478.

FIG. 8 also shows subcircuit 522 that includes Hall Effect switch 524. Present embodiment, using subcircuit 522 permits setting and identify particular VAV terminal controllers using the combination of a magnet with Hall Effect switch 524. By placing a magnet near Hall Effect switch 524, it is possible to identify the specific VAV terminal controller 10 and provide this as an input to a hand-held controller for controlling the set points and other characteristics of that VAV terminal controller 10.

Hall Effect switch 524, at a minimal cost permits non-intrusive identification of a VAV terminal controller 10 in a VAV air conditioning system. Previous devices required insertion of pins or other external circuitry for the identification and control of a particular VAV terminal controller 10 in the VAV air conditioning system. By using, instead, the combination of the magnet and the Hall Effect switch 524, no physical intrusion incurs that may undesirably affect the electrical characteristics of the circuits that appear in FIGS. 7 and 8 for VAV terminal controller 10.

FIG. 9 shows a top overlay diagram for printed circuit board 530 that includes the hardware for VAV terminal controller 10. Each of the identification alphanumerics in top overlay diagram 530 corresponds to the identified circuits and components that appear in FIGS. 7 and 8 of the present embodiment. A particularly important feature of the present invention is the ability to accommodate all of the various components of the present embodiment on a single printed circuit board. This permits the advantageous feature of local placement of VAV terminal controller 10 with the VAV actuator.

A particularly interesting feature of the component layout that appears in top overlay diagram 530 is the dual use of a heat sink associated with the circuit. That is, in top overlay 530 appear regulators 532 and 534. Regulators 532 and 534 are adjacent to flow sensor 536 and produce heat that may affect other components of VAV terminal controller 10. To overcome this potential problem, an aluminum or other metal heat sink may be placed around regulators 532 and 534. In the present embodiment, the same heat sink may be further expanded around flow sensor 536. Placing the heat sink near flow sensor 536 minimizes temperature variations that may affect the operation of flow sensor 536. That is, as external temperature changes in the environment around VAV terminal controller 10, the same heat sink that operates in conjunction with regulators 532 and 534 prevents severe fluctuations in the temperature around flow sensor 536. This produces increased stability in the operation of VAV terminal controller 10.

ALTERNATIVE EMBODIMENTS

There are any number of alternatives or changes in the design of the VAV terminal controller of the present invention which may be readily apparent to one ordinary skill in the art. Such alternatives may not be employed in the systems of the above-illustrated embodiments for any number of reasons, such as cost and performance considerations, size constraints, availability of materials, arbitrary design decision, and the like. A number of these alternatives have been mentioned and described above. There are even further alternatives to forming embodiments of present invention. Such configurations and embodiments are well within the scope of the present invention. Thus, the invention is intended to be limited by the claims which are meant to cover such obvious alternatives and deviations from the above-illustrated and preferred designs.

What is claimed is:

[1. A controller for a variable air volume terminal, of a variable air volume air conditioning system, comprising:

temperature sensing circuitry for generating a temperature process value;

setpoint determining circuitry for establishing a temperature setpoint;

airflow signal circuitry for generating an airflow setpoint in response to said temperature process value and said temperature setpoint;

flow sensing circuitry for generating a flow process value in response to a predetermined set of flow sensing inputs; and damper control circuitry for generating a damper motor operation signal to control the damper motor in response to said flow process value and said airflow setpoint, said damper control circuitry comprising a fuzzy logic control mechanism for implementing a set of fuzzy logic rule-based instructions in generating said damper motor operating signal.]

2. [The controller of claim 1,] *A controller for a variable air volume terminal, of a variable air volume air conditioning system, comprising:*

*temperature sensing circuitry for generating a temperature process value;*

*setpoint determining circuitry for establishing a temperature setpoint;*

*airflow signal circuitry for generating an airflow setpoint in response to said temperature process value and said temperature setpoint;*

*flow sensing circuitry for generating a flow process value in response to a predetermined set of flow sensing inputs; and*

*damper control circuitry for generating a damper motor operation signal to control the damper motor in response to said flow process value and said airflow setpoint, said damper control circuitry comprising a fuzzy logic control mechanism for implementing a set of fuzzy logic rule-based instructions in generating said damper motor operating signal,* wherein said temperature sensing circuitry, said setpoint determining circuitry, said airflow signal circuitry, said flow sensing circuitry, and said damper control circuitry are formed sufficiently small for placement on a single printed circuit board, said printed circuit board formed for placement on the damper motor when said damper motor is installed in the damper shaft.

[3. The controller of claim 1, wherein said temperature sensing circuitry, said setpoint determining circuitry, said airflow signal circuitry, and said flow sensing circuitry operate under an open protocol that permits system-wide control and monitoring of said controller within said variable air volume air conditioning system.]

[4. The controller of claim 1, wherein said temperature sensing circuitry, said setpoint determining circuitry, said airflow signal circuitry, and said flow sensing circuitry are associated to permit pressure dependent operation of said controller.]

[5. The controller of claim 1, wherein said temperature sensing circuitry, said setpoint determining circuitry, said airflow signal circuitry, and said flow sensing circuitry are associated to permit pressure independent operation of said controller.]

6. [The controller of claim 1,] *A controller for a variable air volume terminal, of a variable air volume air conditioning system, comprising:*

*temperature sensing circuitry for generating a temperature process value;*

*setpoint determining circuitry for establishing a temperature setpoint;*

*airflow signal circuitry for generating an airflow setpoint in response to said temperature process value and said temperature setpoint;*

*flow sensing circuitry for generating a flow process value in response to a predetermined set of flow sensing inputs; and*

*damper control circuitry for generating a damper motor operation signal to control the damper motor in response to said flow process value and said airflow setpoint, said damper control circuitry comprising a fuzzy logic control mechanism for implementing a set of fuzzy logic rule-based instructions in generating said damper motor operating signal,* wherein said controller further comprises circuitry for permitting a fire mode of operation for said variable air volume terminal.

[7. The controller of claim 1, further comprising circuitry for permitting a warm-up mode of operation for said variable air volume terminal.]

[8. The controller of claim 1, further comprising circuitry for permitting remote control of said controller for controlling operation of said variable air volume terminal.]

[9. The controller of claim 1, wherein said damper control circuitry further comprises circuitry for automatically calibrating the damper stroke of the damper in the variable air volume terminal.]

[10. The controller of claim 1, wherein said damper control circuitry further comprises circuitry for manually driving the damper of the variable air volume terminal.]

[11. The controller of claim 1, wherein said damper control circuitry further comprises circuitry for automatically stopping movement of the damper at a control stop position for the damper.]

[12. The controller of claim 1, further comprising Hall Effect circuitry for identifying and controlling operation of said temperature sensing circuitry, said setpoint determining circuitry, said airflow signal circuitry, said flow sensing circuitry, and said damper control circuitry upon placing a predetermined magnet device proximate said Hall Effect circuitry.]

[13. The controller of claim 1, wherein said damper control circuitry further comprises circuitry for counting alternating current voltage frequencies to said controller and determining from said alternating current voltage cycles the position of the damper in response to operation of said damper motor.]

[14. The controller of claim 1, further comprising a shield surrounding said flow sensing circuitry for limiting affects of temperature variations on operation of said flow sensing circuitry.]

[15. A method for controlling a variable air volume terminal, having a damper and a damper motor, comprising the steps of:

generating a temperature process value using temperature sensing circuitry;

establishing a temperature setpoint using setpoint determining circuitry;

generating an airflow setpoint in response to said temperature process value and said temperature setpoint using airflow signal circuitry;

generating a flow process value in response to a predetermined set of flow sensing inputs using flow sensing circuitry; and generating a damper motor operation signal using damper control circuitry to control the damper motor in response to said flow process value and said airflow setpoint, said damper motor operation signal generating step further comprising the step of implementing a set of fuzzy logic rule-based instructions in generating said damper motor operating signal.]

16. [The method of claim 5, further comprising the step of] *A method for controlling a variable air volume terminal, having a damper and a damper motor, comprising the steps of:*

*generating a temperature process value using temperature sensing circuitry;*

*establishing a temperature setpoint using setpoint determining circuitry;*

*generating an airflow setpoint in response to said temperature process value and said temperature setpoint using airflow signal circuitry;*

*operating said variable air volume terminal in a warm-up mode of operation*

*generating a flow process value in response to a predetermined set of flow sensing inputs using flow sensing circuitry;*

*generating a damper motor operation signal using damper control circuitry to control the damper motor in response to said flow process value and said airflow setpoint, said damper motor operation signal generating step further comprising the step of implementing a set of fuzzy logic rule-based instructions in generating said damper motor operating signal; and* forming said temperature sensing circuitry, said [set point] *setpoint* determining circuitry, said [air flow] *airflow* signal circuitry, said flow sensing circuitry, and said damper control circuitry sufficiently small for their placement on a single printed circuit board, said printed circuit board formed sufficiently small for placement on the damper motor when said damper motor is installed in the damper shaft.

[17. The method of claim 15, further comprising the step of operating said temperature sensing circuitry, said set point determining circuitry, said air flow signal circuitry, and said flow sensing circuitry under an open protocol that permits system-wide control and monitoring of said controller within said variable air volume air conditioning system.]

[18. The method of claim 15, further comprising the step of associating said temperature sensing circuitry, said set point determining circuitry, said air flow signal circuitry, and said flow sensing circuitry to permit pressure dependent operation of said controller.]

[19. The method of claim 15, further comprising the step of associating said temperature sensing circuitry, said set point determining circuitry, said air flow signal circuitry, and said flow sensing circuitry to permit pressure independent operation of said controller.]

20. [The method of claim 15, further comprising the step of] *A method for controlling a variable air volume terminal, having a damper and a damper motor, comprising the steps of:*

*generating a temperature process value using temperature sensing circuitry;*

*establishing a temperature setpoint using setpoint determining circuitry;*

*generating an airflow setpoint in response to said temperature process value and said temperature setpoint using airflow signal circuitry;*

*operating said variable air volume terminal in a warm-up mode of operation*

*generating a flow process value in response to a predetermined set of flow sensing inputs using flow sensing circuitry;*

*generating a damper motor operation signal using damper control circuitry to control the damper motor in response to said flow process value and said airflow setpoint, said damper motor operation signal generating step further comprising the step of implementing a set of fuzzy logic rule-based instructions in generating said damper motor operating signal; and* permitting a fire mode of operation for said variable air volume terminal.

[21. The method of claim 15, further comprising the step of operating said variable air volume terminal in a warm-up mode of operation.]

[22. The method of claim 15, further comprising circuitry for permitting remote control of said controller for controlling operation of said variable air volume terminal.]

[23. The method of claim 15, further comprising the step of automatically calibrating the damper stroke of the damper in the variable air volume terminal.]

[24. The method of claim 15, further comprising the step of manually driving the damper of the variable air volume terminal.]

[25. The method of claim 15, further comprising the step of automatically stopping movement of the damper at a control stop for the damper.]

[26. The method of claim 15, further comprising the step of identifying and controlling operation of said temperature sensing circuitry, said setpoint determining circuitry, said airflow signal circuitry, said flow sensing circuitry, and said damper control circuitry by placing a predetermined magnet device proximate a Hall Effect circuit of the controller.]

[27. The method of claim 15, further comprising the step of counting alternating current voltage frequencies to the controller and determining from the alternating current voltage cycles the position of the damper in response to operation of the damper motor.]

[28. The method of claim 15, further comprising the step of limiting affects of temperature variations on operation of said flow sensing circuitry using an enclosed shield surrounding the airflow signal circuitry.]

[29. A variable air volume air conditioning system, comprising:

a controller for a variable air volume terminal;

a variable air volume terminal comprising a damper, a damper motor associated to move said damper, and a terminal controller for controlling operation of said damper motor, said terminal controller comprising:

temperature sensing circuitry for generating a temperature process value;

setpoint determining circuitry for establishing a temperature setpoint;

airflow signal circuitry for generating an airflow setpoint in response to said temperature process value and said temperature setpoint;

flow sensing circuitry for generating a flow process value in response to a predetermined set of flow sensing inputs; and damper control circuitry for generating a damper motor operation signal to control the damper motor in response to said flow process value and said airflow setpoint, said damper control circuitry comprising a fuzzy logic control mechanism for implementing a set of fuzzy logic rule-based instructions in generating said damper motor operating signal.]

30. [The system of claim 29,] *A variable air volume air conditioning system, comprising:*

*a variable air volume terminal controller; and*

*a variable air volume terminal further comprising a damper, a damper motor associated to move said damper, and a terminal controller for controlling operation of said damper motor, said terminal controller comprising:*

*temperature sensing circuitry for generating a temperature process value;*

*setpoint determining circuitry for establishing a temperature setpoint;*

*airflow signal circuitry for generating an airflow setpoint in response to said temperature process value and said temperature setpoint;*

*flow sensing circuitry for generating a flow process value in response to a predetermined set of flow sensing inputs; and*

*damper control circuitry for generating a damper motor operation signal to control the damper motor in response to said flow process value and said airflow setpoint, said damper control circuitry comprising a fuzzy logic control mechanism for implementing a set of fuzzy logic rule-based instructions in generating said damper motor operating signal,* wherein said temperature sensing circuitry, said setpoint determining circuitry, said airflow signal circuitry, said flow sensing circuitry, and said damper control circuitry are formed sufficiently small for placement on a single printed circuit board, said printed circuit board being formed for placement on the damper motor when said damper motor is installed in the damper shaft.

[31. The system of claim 29, wherein said temperature sensing circuitry, said setpoint determining circuitry, said airflow signal circuitry, and said flow sensing circuitry operate under an open protocol that permits system-wide control and monitoring of said controller within said variable air volume air conditioning system.]

[32. The system of claim 29, wherein said temperature sensing circuitry, said setpoint determining circuitry, said airflow signal circuitry, and said flow sensing circuitry are associated to permit pressure dependent operation of said controller.]

[33. The system of claim 29, wherein said temperature sensing circuitry, said set point determining circuitry, said air flow signal circuitry, and said flow sensing circuitry, are associated to permit pressure independent operation of said controller.]

34. [The system of claim 29, wherein said controller further comprises] *A variable air volume air conditioning system, comprising:*

*a variable air volume terminal controller; and*

*a variable air volume terminal further comprising a damper, a damper motor associated to move said damper, and a terminal controller for controlling operation of said damper motor, said terminal controller comprising:*

*temperature sensing circuitry for generating a temperature process value;*

*setpoint determining circuitry for establishing a temperature setpoint;*

*airflow signal circuitry for generating an airflow setpoint in response to said temperature process value and said temperature setpoint;*

*flow sensing circuitry for generating a flow process value in response to a predetermined set of flow sensing inputs;*

*damper control circuitry for generating a damper motor operation signal to control the damper motor in response to said flow process value and said airflow setpoint, said damper control circuitry comprising a fuzzy logic control mechanism for implementing a set of fuzzy logic rule-based instructions in generating said damper motor operating signal; and* circuitry for permitting a fire mode of operation for said variable air volume terminal.

[35. The system of claim 29, further comprising circuitry for permitting a warm-up mode of operation for said variable air volume terminal.]

[36. The system of claim 29, further comprising circuitry for permitting remote control of said controller for controlling operation of said variable air volume terminal.]

[37. The system of claim 29, wherein said damper control circuitry further comprises circuitry for automatically calibrating the damper stroke of the damper in the variable air volume terminal.]

[38. The system of claim 29, wherein said damper control circuitry further comprises circuitry for manually driving the damper of the variable air volume terminal.]

[39. The system of claim 29, wherein said damper control circuitry further comprises circuitry for automatically stopping movement of the damper at a control stop position for the damper.]

[40. The system of claim 29, further comprising Hall Effect circuitry for identifying and controlling operation of said temperature sensing circuitry, said setpoint determining circuitry, said airflow signal circuitry, said flow sensing circuitry, and said damper control circuitry upon placing a predetermined magnet device in proximity to said Hall Effect circuitry.]

[41. The system of claim 29, wherein said damper control circuitry further comprises circuitry for counting alternating current voltage frequencies to said controller and determining from said alternating current voltage cycles the position of the damper in response to operation of said damper motor.]

[42. The system of claim 29, further comprising a shield surrounding said flow sensing circuitry for limiting affects of temperature variations on operation of said flow sensing circuitry.]

*43. A controller for a variable air volume terminal, of a variable air volume air conditioning system, comprising:*

*temperature sensing circuitry for generating a temperature process value;*

*setpoint determining circuitry for establishing a temperature setpoint;*

*airflow signal circuitry for generating an airflow setpoint in response to said temperature process value and said temperature setpoint;*

*flow sensing circuitry for generating a flow process value in response to a predetermined set of flow sensing inputs; and*

*damper control circuitry for generating a damper motor operation signal to control the damper motor in response to said flow process value and said airflow setpoint, said damper control circuitry comprising:*

*a fuzzy logic control mechanism for implementing a set of fuzzy logic rule-based instructions in generating said damper motor operating signal; and*

*circuitry for automatically stopping movement of the damper at a control stop position for the damper.*

*44. The controller of claim 43, further comprising circuitry for permitting a warm-up mode of operation for said variable air volume terminal.*

*45. The controller of claim 43, wherein said damper control circuitry further comprises circuitry for automatically calibrating the damper stroke of the damper in the variable air volume terminal.*

*46. The controller of claim 43, wherein said damper control circuitry further comprises circuitry for manually driving the damper of the variable air volume terminal.*

*47. The controller of claim 43, further comprising Hall Effect circuitry for identifying and controlling operation of said temperature sensing circuitry, said setpoint determining circuitry, said airflow signal circuitry, said flow sensing circuitry, and said damper control circuitry upon placing a predetermined magnet device proximate said Hall Effect circuitry.*

*48. The controller of claim 43, wherein said damper control circuitry further comprises circuitry for counting alternating current voltage frequencies to said controller and determining from said alternating current voltage cycles the position of the damper in response to operation of said damper motor.*

*49. The controller of claim 43, further comprising a shield surrounding said flow sensing circuitry for limiting affects of temperature variations on operation of said flow sensing circuitry.*

*50. A method for controlling a variable air volume terminal, having a damper and a damper motor, comprising the steps of:*

*generating a temperature process value using temperature sensing circuitry;*

*establishing a temperature setpoint using setpoint determining circuitry;*

*generating an airflow setpoint in response to said temperature process value and said temperature setpoint using airflow signal circuitry;*

*operating said variable air volume terminal in a warm-up mode of operation*

*generating a flow process value in response to a predetermined set of flow sensing inputs using flow sensing circuitry; and*

*generating a damper motor operation signal using damper control circuitry to control the damper motor in response to said flow process value and said airflow setpoint, said damper motor operation signal generating step further comprising the steps of:*

*implementing a set of fuzzy logic rule-based instructions in generating said damper motor operating signal; and*

*automatically stopping movement of the damper at a control stop for the danger.*

*51. The method of claim 50, further comprising the step of operating said variable air volume terminal in a warm-up mode of operation.*

*52. The method of claim 50, further comprising the step of automatically calibrating the damper stroke of the damper in the variable air volume terminal.*

*53. The method of claim 50, further comprising the step of manually driving the damper of the variable air volume terminal.*

*54. The method of claim 50, further comprising the step of identifying and controlling operation of said temperature sensing circuitry, said setpoint determining circuitry, said airflow signal circuitry, said flow sensing circuitry, and said damper control circuitry by placing a predetermined magnet device proximate a Hall Effect circuit of the controller.*

*55. The method of claim 50, further comprising the step of counting alternating current voltage frequencies to the controller and determining from the alternating current voltage cycles the position of the damper in response to operation of the damper motor.*

*56. The method of claim 50, further comprising the step of limiting affects of temperature variations on operation of said flow sensing circuitry using an enclosed shield surrounding the airflow signal circuitry.*

*57. A variable air volume air conditioning system, comprising:*

*a controller for a variable air volume terminal; and*

*a variable air volume terminal comprising a damper, a damper motor associated to move said damper, and a terminal controller for controlling operation of said damper motor, said terminal controller comprising:*

*temperature sensing circuitry for generating a temperature process value;*

*setpoint determining circuitry for establishing a temperature setpoint;*

*airflow signal circuitry for generating an airflow setpoint in response to said temperature process value and said temperature setpoint;*

*flow sensing circuitry for generating a flow process value in response to a predetermined set of flow sensing inputs; and*

*damper control circuitry for generating a damper motor operation signal to control the damper motor in response to said flow process value and said airflow setpoint, said damper control circuitry comprising:*

*a fuzzy logic control mechanism for implementing a set of fuzzy logic rule-based instructions in generating said damper motor operating signal; and*

*circuitry for automatically stopping movement of the damper at a control stop position for the damper.*

*58. The system of claim 57, further comprising circuitry for permitting a warm-up mode of operation for said variable air volume terminal.*

*59. The system of claim 57, wherein said damper control circuitry further comprises circuitry for automatically calibrating the damper stroke of the damper in the variable air volume terminal.*

*60. The system of claim 57, wherein said damper control circuitry further comprises circuitry for manually driving the damper of the variable air volume terminal.*

*61. The system of claim 57, further comprising Hall Effect circuitry for identifying and controlling operation of said temperature sensing circuitry, said setpoint determining circuitry, said airflow signal circuitry, said flow sensing circuitry, and said damper control circuitry upon placing a predetermined magnet device in proximity to said Hall Effect circuitry.*

*62. The system of claim 57, wherein said damper control circuitry further comprises circuitry for counting alternating current voltage frequencies to said controller and determining from said alternating current voltage cycles the position of the damper in response to operation of said damper motor.*

*63. The system of claim 57, further comprising a shield surrounding said flow sensing circuitry for limiting affects of temperature variations on operation of said flow sensing circuitry.*

* * * * *